United States Patent [19]

Petersen et al.

[11] Patent Number: 5,392,406
[45] Date of Patent: Feb. 21, 1995

[54] DMA DATA PATH ALIGNER AND NETWORK ADAPTOR UTILIZING SAME

[75] Inventors: Brian Petersen, Los Altos; Lai-Chin Lo, Campbell; David R. Brown, San Jose, all of Calif.

[73] Assignee: 3COM Corporation, Santa Clara, Calif.

[21] Appl. No.: 947,055

[22] Filed: Sep. 18, 1992

[51] Int. Cl.⁶ .............................................. G06F 13/00
[52] U.S. Cl. ...................................... 395/325; 395/250; 395/425; 364/DIG. 1; 364/238.6; 364/239.1; 364/239.3; 364/240; 364/240.2; 364/246.3; 364/260
[58] Field of Search ............... 395/425, 325, 275, 250

[56] References Cited

U.S. PATENT DOCUMENTS

| | | | |
|---|---|---|---|
| 4,447,878 | 5/1984 | Kinnie | 395/325 |
| 4,506,345 | 3/1985 | Boothroyd et al. | 377/54 |
| 4,672,570 | 1/1987 | Benken | 395/200 |
| 4,841,435 | 6/1989 | Papenberg | 395/250 |
| 4,959,779 | 9/1990 | Weber et al. | 395/775 |
| 4,992,931 | 2/1991 | Hirasawa | 395/500 |
| 5,014,186 | 5/1991 | Chisholm | 395/275 |
| 5,058,051 | 10/1991 | Brooks | 395/425 |
| 5,113,369 | 5/1992 | Kinoshita | 395/325 |
| 5,125,080 | 6/1992 | Pleva et al. | 395/325 |
| 5,168,561 | 12/1992 | Vo | 395/425 |
| 5,170,477 | 12/1992 | Potter et al. | 395/425 |
| 5,179,671 | 1/1993 | Kelly et al. | 395/375 |
| 5,185,876 | 2/1993 | Nguyen et al. | 395/425 |
| 5,274,763 | 12/1993 | Banks | 395/325 |
| 5,276,891 | 1/1994 | Patel | 395/775 |

*Primary Examiner*—Jack B. Harvey
*Assistant Examiner*—Ayaz R. Sheikh
*Attorney, Agent, or Firm*—Haynes & Davis

[57] ABSTRACT

A data path aligner transfers data from an input having N byte lanes with byte enable bits to an output having N byte lanes. The aligner includes first stage having N−1 selector/registers, and a second stage having N selector/registers. Each of the N−1 selector/registers S1(i) in the first stage has inputs including input lanes L(j) for j going from i+1 to N. Each of the selector/registers S2(i) in the second stage has inputs including input lanes L(k) for k going from i to 0, and for selector/registers S2(i) for i less than or equal to N−2, the inputs include the output of a first stage selector/register S1(i). The outputs of the second stage selector/registers supply data selected from the respective inputs to output segment lanes. All of these selector/registers are controlled by a common select signal derived from a data path offset, and all selector/registers are clocked by a common clock.

35 Claims, 11 Drawing Sheets

FIG.—1

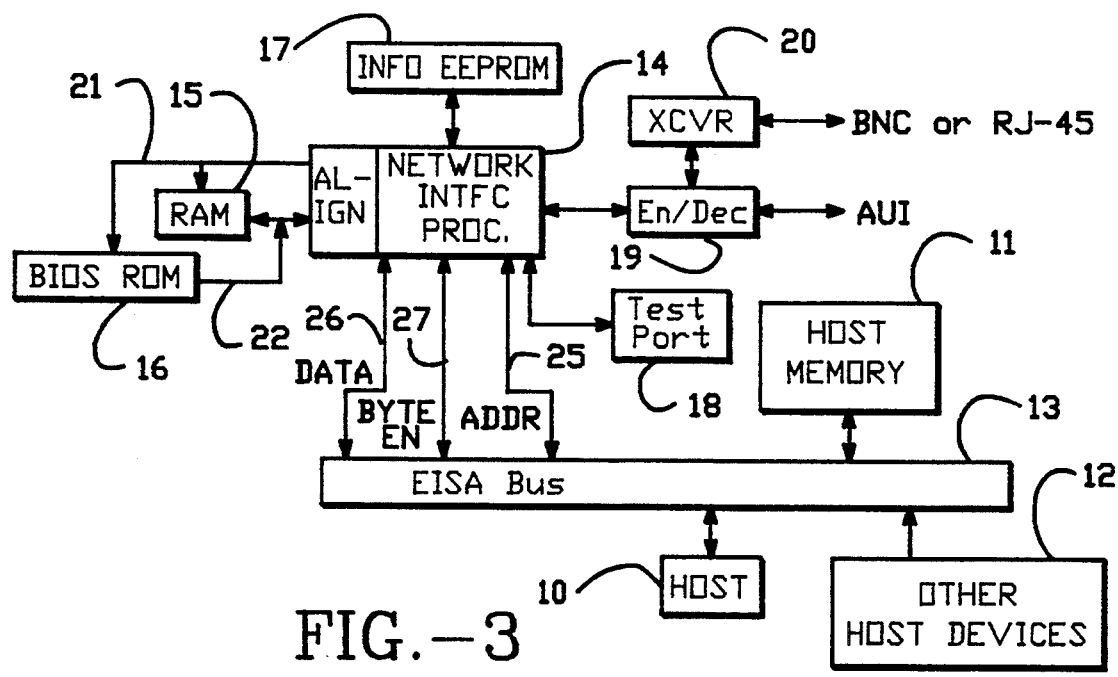
FIG.—3
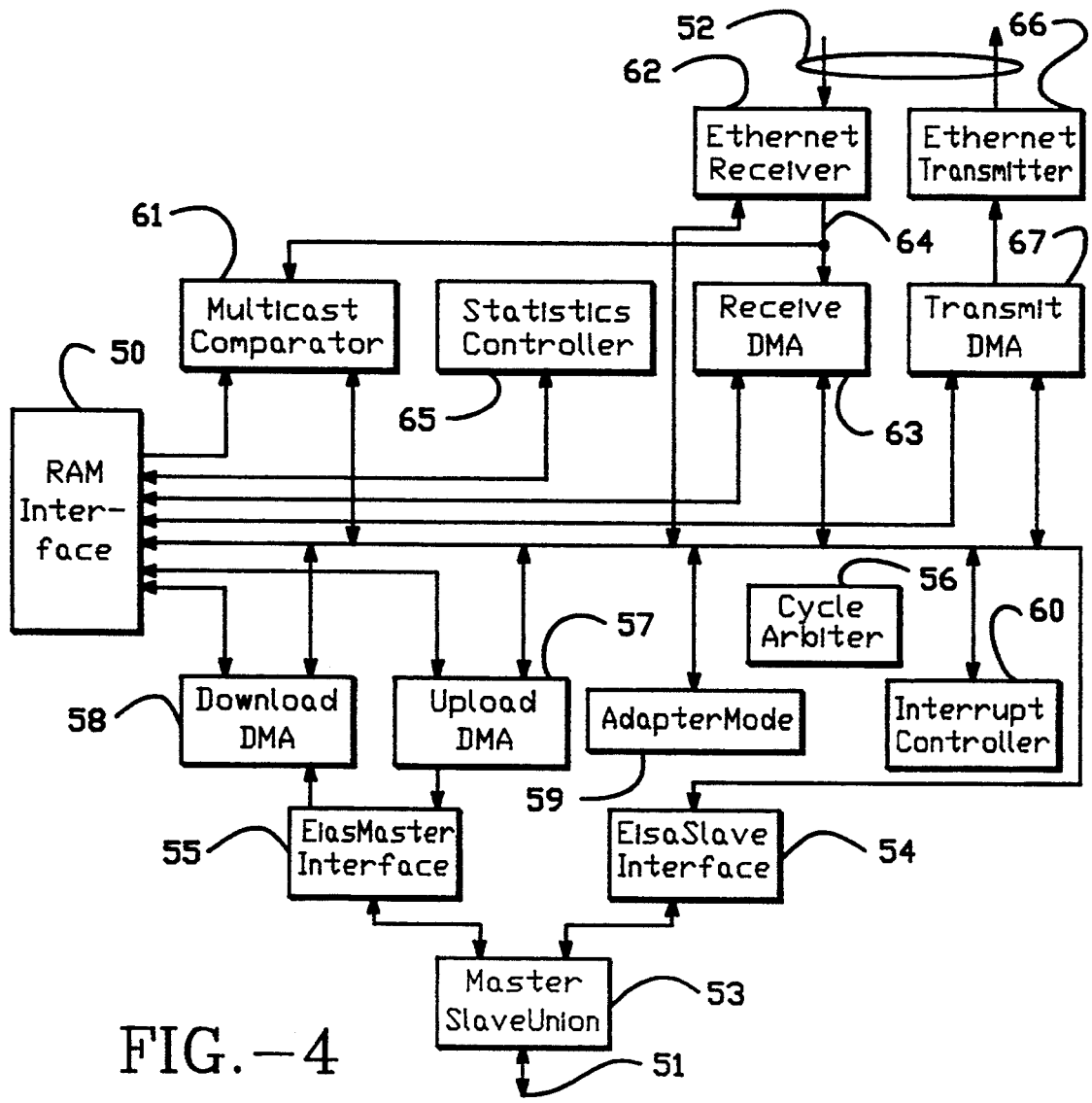
FIG.—4

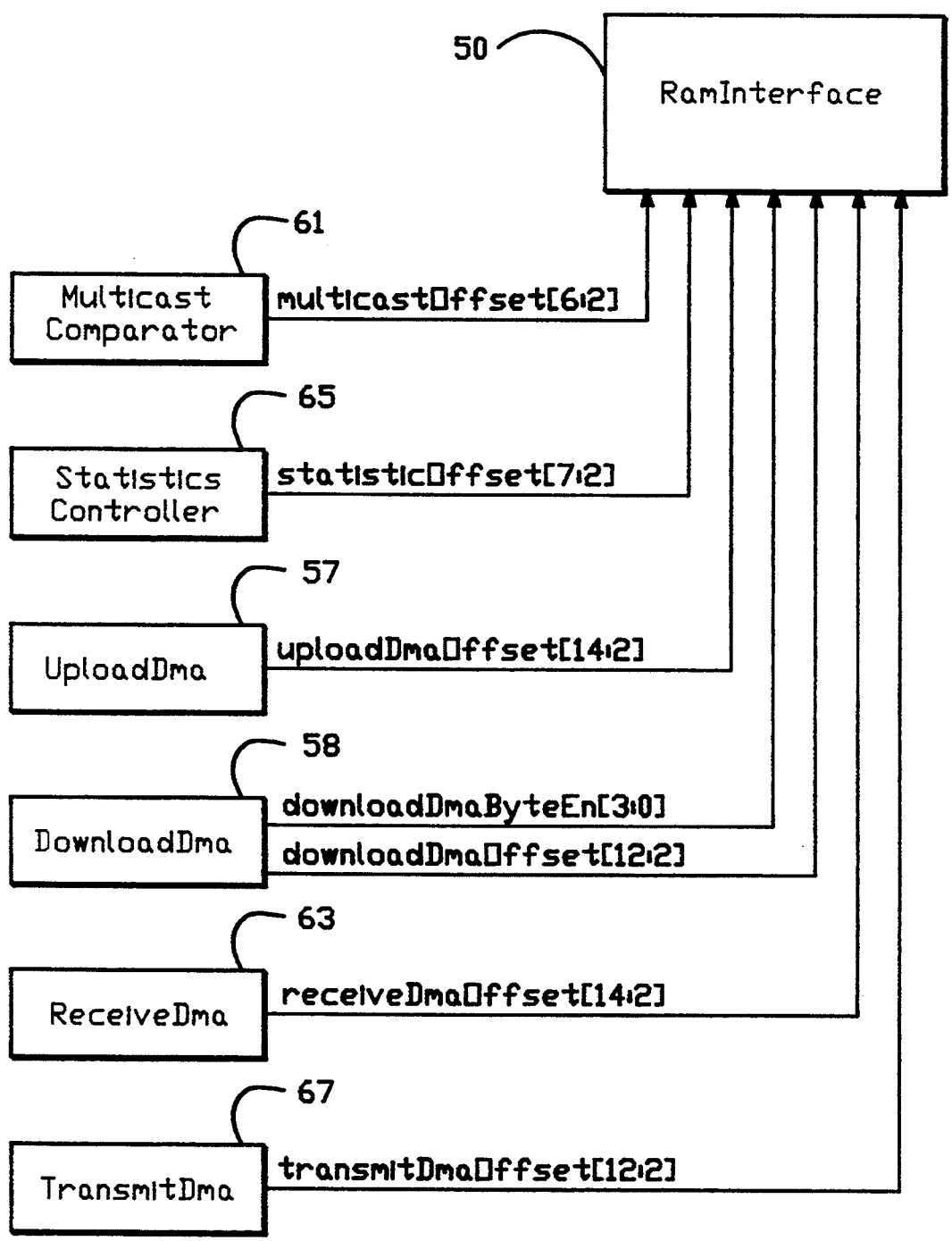
Autonomous Access Address Bus Structure
FIG.—4A

Adapter RAM Memory Map

| base address | | size |
|---|---|---|
| 0x0 | Transmit Data Buffer | 3K |
| 0xc00 | Transmit Descriptors | 5K |
| 0x2000 | Reveice Buffer | 22K |
| 0x7800 | Transfer Descriptor | 1K |
| 0x7c00 | AdapterInfo Data | 256 |
| 0x7d00 | Network Statistics | 196 |
| 0x7e00 | Muticast Address Table | 96 |

FIG.—7

| 31 | 16 | 15 | 0 | Offset |
|---|---|---|---|---|
| \multicolumn{4}{c}{NextDescriptorPointer} | 0x0 |
| \multicolumn{4}{c}{XmitFailure} | 0x4 |
| \multicolumn{4}{c}{FrameLength} | 0x8 |
| XmitReqHandle | | XmitStatus | | 0xc |
| XmitProtId | | MACID | | 0x10 |
| XmitBufferCount | | XmitImmedLen | | 0x14 |
| \multicolumn{4}{c}{Immediate Data} | 0x18 |
| XmitDataLen | | 0 | | ↑ repeated |
| \multicolumn{4}{c}{XmitDataPtr} | XmitBufferCount times ↓ |

FIG.—8

| | Offset |
|---|---|
| NextRcvPtr | 0x0 |
| RcvFrameStatus | 0x4 |
| MACID \| RcvFrameSize | 0x8 |
| | 0xc |
| Receive Data | |

FIG.—12

| 31 | 16 | 15 | 0 | Offset |
|---|---|---|---|---|
| \multicolumn{4}{c}{reserved} | 0x0 |
| TDOffset | | TDBuffer Count | | 0x4 |
| TDDataLen | | 0 | | 0x8 |
| \multicolumn{4}{c}{TDDataPtr} | | repeated TDBufferCount times

FIG.—13

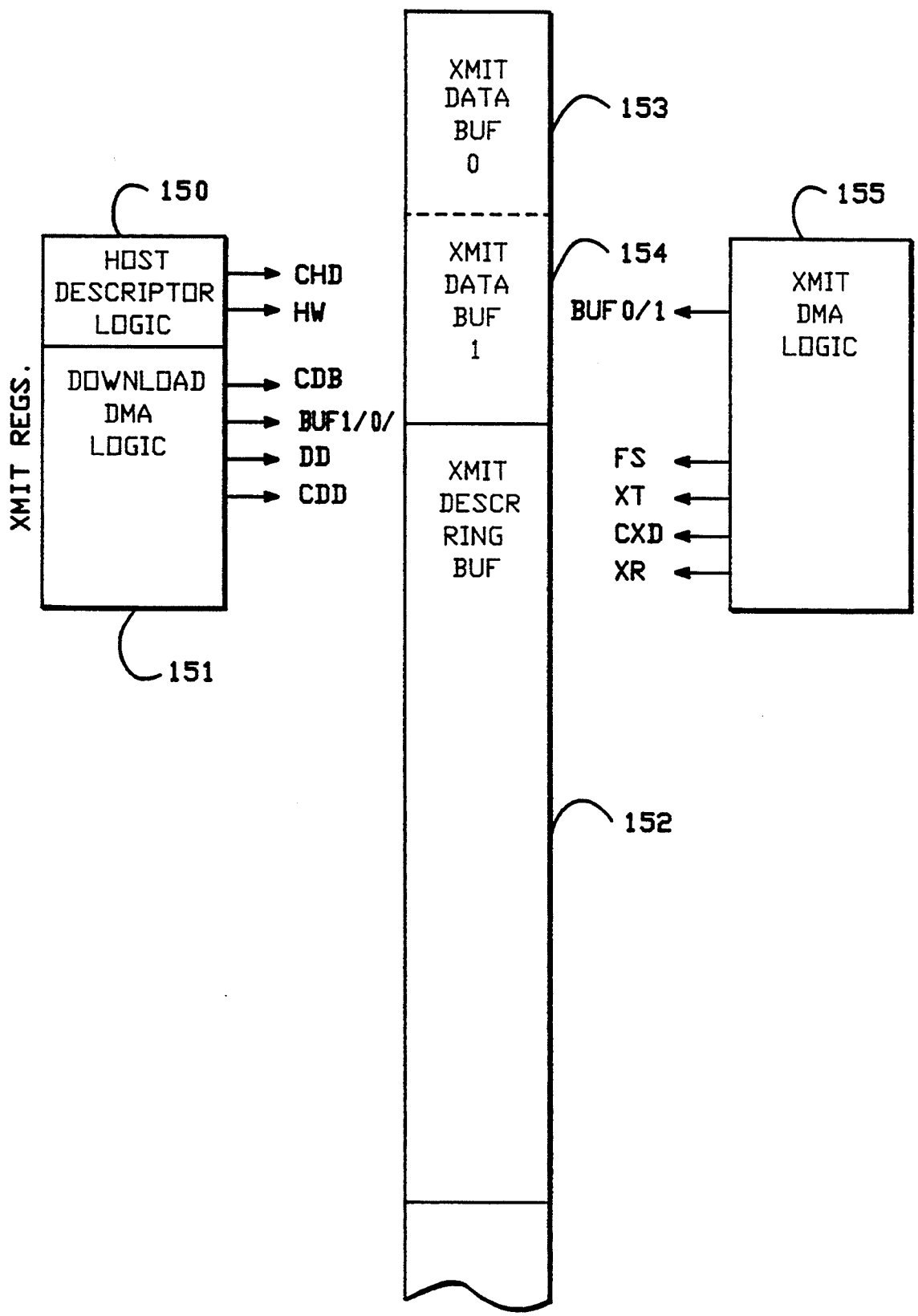
FIG.—9

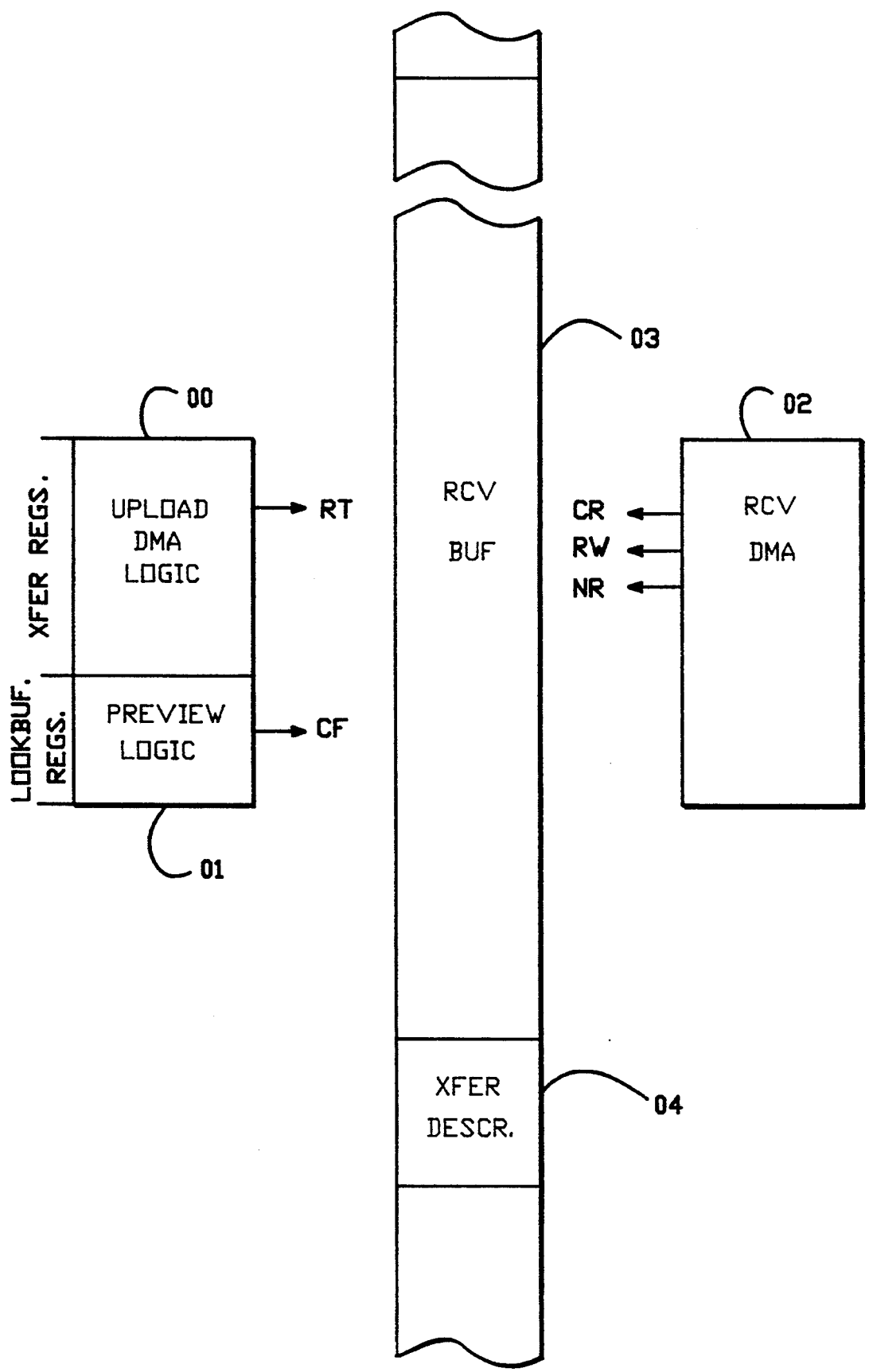
FIG.—14

DMA DATA PATH ALIGNER AND NETWORK ADAPTOR UTILIZING SAME

CROSS-REFERENCE TO RELATED APPLICATION

The present application is related to copending U.S. patent application entitled NETWORK INTERFACE WITH HOST INDEPENDENT BUFFER MANAGEMENT, Ser. No. 07/921,519, filed Jul. 28, 1992, which was owned at the time of invention and is currently owned by the same assignee.

BACKGROUND OF THE INVENTION

1. Field Of the Invention

The present invention relates to direct memory access (DMA) controllers, and data path alignment logic used with such controllers. More particularly, the present invention relates to the application of data path aligners in peripheral devices such as network adaptors.

2. Description of Related Art

DMA controllers are used in computer systems for moving blocks of data from one location to the next, while relieving the host processor of the need to generate a long sequence of addresses to accomplish the move. The DMA controller is started by an event, and generates the addresses for moving data from a source location to a destination location. Typically the data is a large block of data which begins at a source address, and is moved to a destination beginning at a destination address. Such DMA controllers have wide spread application in the computer industry.

In many environments, a source memory may store data on double-word boundaries, each double-word consisting of four bytes of data. According to one conventional use of the terminology, a byte is composed of eight bits, a word is composed of 16 bits (two bytes), and a double-word is composed of 32 bits (four bytes).

The destination memory may also store double-words on each access to the memory. Thus, each read or write cycle involves accessing a double-word of memory from either the source or the destination memory.

In many computer systems, such as the EISA bus or Microchannel bus systems, while data may be stored on double-word boundaries, memories storing the data may be addressed on byte or word boundaries. Thus, the beginning of a block of memory to be moved by a DMA access may reside on a byte, word or double-word boundary within the memory. Similarly, the destination to which this block of data is to move may begin on a byte, word or double-word boundary.

A problem arises when the starting address in the source does not align on byte boundaries with the starting address in the destination. For instance, if a starting word in the source memory includes the third and fourth bytes at a given double-word location, and the starting address in the destination memory begins with the second byte in a double-word location, the DMA system must provide for moving the data from the third and fourth positions to the second and third positions. After this transfer, the fourth position in the destination address remains empty. A second read to the source will retrieve four bytes of data from a next double-word location. However, the first byte must be stored in the fourth position of the first double-word location in the destination memory. This leaves three bytes for storage in the second double-word location in the destination memory. As can be seen, this data path alignment requires two read/write cycles per location in the destination memory to completely fill the destination memory.

It is desireable to provide a faster, more efficient mechanism for aligning the data from a source memory in a destination memory on byte, word and double-word boundaries. This is particularly critical in high speed applications, such as efficient network interface adaptor systems and the like.

SUMMARY OF THE INVENTION

The present invention provides an apparatus for transferring data from an input data path having N byte lanes with byte enable bits, to an output data path having a plurality of byte lanes. The apparatus comprises logic for supplying a data path offset signal which is responsive to the source and destination addresses involved in the transfer. The data path offset signal is supplied to an aligner in the data path which controls the alignment of bytes of data in the data path so that the multi-byte locations in the destination may be filled with data without requiring multiple reads per source address to multi-byte locations in the source memory, when the beginning of the block of memory in host memory is not aligned with the beginning of the destination memory block.

According to one aspect, the data path aligner includes a two-stage pipeline. In the first stage for a system having N byte lanes, includes at least $N-1$ selector/registers for staging bytes of data from the source memory, and the second stage includes at least N selector/registers for supplying output data to the destination memory. The $N-1$ selector/registers in the first stage of the pipeline have respective input multiplexers for supplying a byte of data and a byte enable bit from a selected byte lane in response to the data path offset signal. The inputs to the multiplexers can be characterized as input subsets of the N segment lanes, wherein the input subset for a first stage selector/register $S1(i)$ includes segment lanes $L(j)$ for j going from $i+1$ to N. Thus, the selector/register at index $i=0$ has inputs from byte lanes 1, 2 and 3. Similarly, the selector/register at index $i=1$ has inputs from segment lanes 2 and 3. The inputs for the selector/register at index $i=2$ receives input from segment lane 3. There is no selector/register in the first stage for index $i=3$.

The second stage selector/registers include one register for each byte lane with respective input multiplexers. Again, the inputs to these selector/registers may be characterized as an input subset for a second stage selector/register $S2(i)$. The input subsets for the second stage selector/registers $S2(i)$ includes segment lanes $L(k)$ for k going from i to 0, and, for i less than or equal to $N-2$, the output of a first stage selector/register S1 (i). The outputs of the second stage selector/registers supply data selected from the respective input subsets to the output segment lanes $0(i)$.

The first and second stages may be implemented using an identical structure for each selector/register. Thus, each selector/register in this implementation includes a four to one multiplexer and a nine bit register. All of the four to one multiplexers are controlled by a single two bit data path offset signal. The input subsets of the respective selector/registers may include less than four different valid segment lanes. In the case of the first stage selector/registers S1 (i), the segment lanes that are invalid permanently store a byte enable bit which indicates invalid data in the segment lane. For the second stage selector/registers S2(i) including less than four different inputs, the extra inputs provide copies of the output of the first stage selector/register S1 (i).

Using this structure with identical selector/register combinations, vastly simplifies the control logic and a design effort necessary to implement the present invention.

According to another aspect of the invention, a network adaptor is provided which includes a transmit buffer for buffering data of frames transferred from the host system, and a data path between the transmit buffer and the host system. DMA logic for downloading data from the host to the transmit buffer is provided. Also a network interface which transfers data out of the transmit buffer for supply to an attached network is included in the adaptor. A data path aligner as described above is provided in the data path between the transmit buffer and the host system. In another embodiment, the adaptor also includes a receive buffer with a path between the receive buffer and the host including a data path aligner.

As can be seen, the data path aligner of the present invention provides for fast, efficient alignment of data in DMA transferred operation, such as those necessary for efficient operation of peripheral devices like network adaptors.

Other aspects and advantages of the present invention can be seen upon review of the figures, the detailed description, and the claims which follow.

BRIEF DESCRIPTION OF THE FIGURES

FIG. 3 is a block diagram of a preferred implementation of the host system and network interface according to the present invention.

FIG. 4 is a block diagram of the network interface processor of FIG. 3 implementing the present invention.

FIG. 4A is a schematic diagram of the autonomous access address buses within the processor of FIG. 4.

FIG. 7 is a memory map of the adaptor memory independent of the host system address space.

FIG. 8 illustrates the transcript .descriptor data structure according to one aspect of the present invention.

FIG. 9 illustrates the management of the transmit descriptor ring buffer and transmit data buffer, and pointers used during the transmit operation according to the present invention.

FIG. 12 illustrates the receive frame data structure.

FIG. 13 illustrates the transfer area descriptor format.

FIG. 14 is a heuristic diagram illustrating the operation of the receive ring buffer and a transfer descriptor buffer, along with pointers generated by the host and network interfaces to manage these buffers.

DETAILED DESCRIPTION

Figure 1:
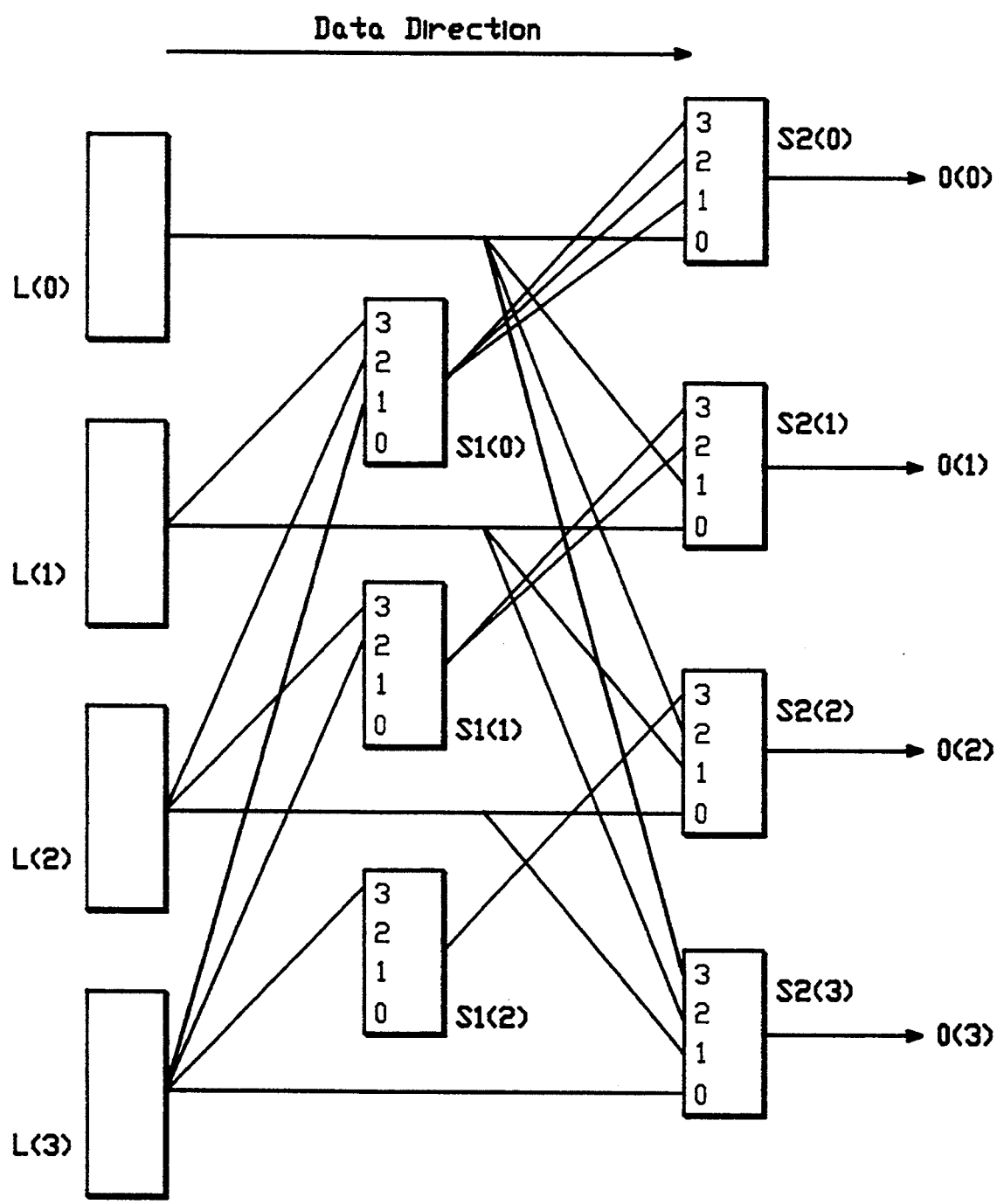
FIG. 1 is a simplified block diagram of a data path aligner according to the present invention.
Figure 2:
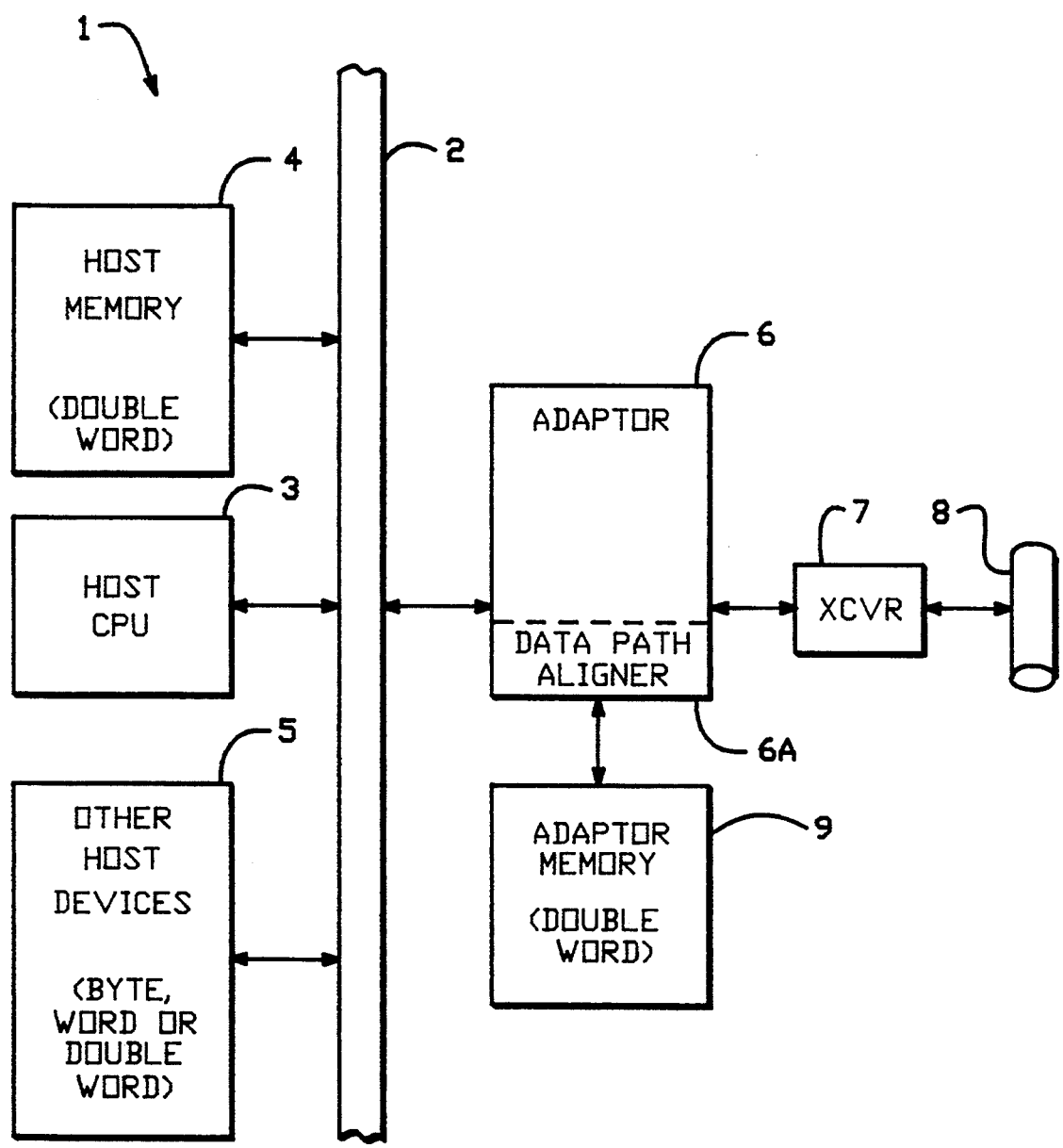
FIG. 2 is a schematic block diagram of a system with a network adaptor using a data path aligner according to the present invention.

A detailed description of preferred embodiments of the present invention is provided with respect to Figures. FIG. 1 provides a functional overview of the DMA data path aligner of the present invention. FIG. 2 illustrates application of the invention in a peripheral device. FIGS. 3–15 provide a detailed description of a network adaptor utilizing the present invention.

I. Function Overview and Application

FIG. 1 illustrates data flow in a DMA data path aligner according to the present invention. As can be seen, the data path aligner includes a plurality of input portals, referred to as lanes L(0) through L(3) for a four byte data path aligner. Each lane L(i), for i=0 through i=3, includes a byte of data and a byte enable bit.

The byte of data in one embodiment is eight bits. The term byte is used herein as a familiar terminology to those of skill in the art. The invention may be applied to segments of data of any size, from one bit per lane up. Also, the segment enable bit may be carried with the data in the manner of an EISA bus, or specially generated for the alignment function.

The data path aligner includes a plurality of first stage selector/registers S1(i) for i=0 through i=2.

The data path aligner also includes a plurality of second stage selector/registers S2(0) through S2(3). The plurality of second stage selector/registers S2(i) for i=0 through i=3, is coupled into a plurality of respective output lanes 0(0) through 0(3).

Each of the plurality of first stage selector/registers S1 (i) includes an input subset selected from the input portals L(i). In this embodiment, each includes a four input multiplexer and a register (or other storage element) for storing the results of the selection.

The input subset for a first stage selector/register S1 (i) includes the segment lanes L(j) for j going from i+1 to N. Thus, selector/register S1(0) receives inputs L(1), L(2) and L(3) at inputs labelled 3, 2 and 1 respectively. The input 0 does not receive any data from an input segment lane.

Similarly, the output stage selector/registers S2(i) have four input multiplexers and a register (or other storage element) for storing the result of the selection. The input subsets for a given second stage selector/register S2(i) includes segment lanes L(k) for k going from i to 0, and for i less than or equal to N−2, the output of a first stage S1 (i). Thus, second stage selector/register S2(1 ) receives as inputs, data from lanes L(0) and L(1), and data from the output of first stage selector/register S1(1). At the fourth input to second stage selector/register S2(1), a second copy of the output of first stage register S1 (1) is provided.

For selector/register S2(0) three copies of the output of selector/register S1 (0) are provided at inputs 3, 2, and 1, and lane L(0) is connected to input 0.

For an eight bit byte, each of the selector/registers S1 (i) and S2(i) include a plurality of nine bit D-Q registers with multiplexed inputs. The select control inputs for all of the seven multiplexers (not shown) are tied together to a single data path offset signal. Likewise, the registers in the stages are wired to a common clock.

The ninth bit of each of the data paths is occupied by a data enable indication. If the ninth bit of any register is low, then the remaining eight bits of that register contain valid data. This function is used during boundary operations. Boundary operations are those that occur near the start or end of a transfer where alignment on 32 bit boundaries and transfers of full 32 bit double-words are not guaranteed.

Each of the selector/registers S1(i) in the first stage has unused inputs. If an unused input is selected when the device is clocked, the register automatically sets the data enable bit to indicate that the register does not contain valid data.

The clock for all seven registers is derived from the DMA transfer operation. The offset value that is applied to the select inputs of the selector/registers is the difference between the least two significant bits of the destination starting address and the least two significant bits of the host starting address. This results in a two bit data offset value which can be used to control each of the four to one multiplexers involved in the stages of the data path aligner. This offset stays the same during a complete transfer of a sequence of data from a source to a destination address.

The following several paragraphs provide examples that help to illustrate the operation of the data path aligner.

A. Basic Pass-Through: In this case, both the source and the destination have start addresses with two least significant bits of '00. The difference is '00 and the data selector/registers S2(i) in the second stage select the un-delayed data supplied by the lanes L(i) from the portals.

B. Basic Pass-Through With Offset Addressing: Here, both source and destination have a start value that is non-zero, yet the same. For example, the least significant two bits of both the source and the destination addresses are 10. In this case, the difference is also '00, causing the data path to not alter the data alignment. However, the offset into the destination is preserved because the byte enables will flag the least significant two bytes of the 32-bit word as being invalid during the first transfer.

C. Shifted Data: In this example, the source has a starting address whose least significant two bits are '01 and the destination starting address ends in '00. This results in a select code of 3 ('00–'01) being applied to all of the selector/registers.

During the first cycle, the source will supply a word with three valid bytes. The data enable signal for the least significant byte will be high, indicating an invalid byte.

The offset of 3 will cause the byte in lane L(0) to be latched into the second stage selector/register S2(3), the byte in lane L(1) to be stored in the selector/register S1(0), the byte in lane L(2) to be stored in the selector/register of S1(1) and the byte in lane L(3) to be held in the selector/register of S1(3).

Because the input byte in lane L(0) is invalid for the first cycle and the selector/registers S1 (i) all previously contained invalid data, all four output selector/registers S2(i) will contain invalid data (data enable signal high) after the first data clock.

On the second cycle, the source will supply a 32-bit word that contains four valid bytes. Byte 0 of this word is stored into output selector/register S2(3) and the three bytes in first stage selector/registers S1(0), S1(1) and S1(2) from the previous cycle are written to second stage selector/registers S2(0), S2(1), and S2(2), respectively.

This second cycle has built a 32-bit word of valid data that is properly ordered and aligned on outputs O(i) for use by the destination.

D. End of Transfer Condition: After the very last word (destination partial or full) has been supplied by the source and the data has been transferred, a controller module will generate an extra data clock cycle. This extra cycle is used to flush any bytes that may reside within the selector/registers S1 (i) of the first stage. If any of the bytes in the selector/registers S1(i) are valid, the module will request an additional memory cycle from the destination.

FIG. 2 illustrates a data communication system according to the present invention with a controller circuit using a dedicated buffer memory and a data path aligner according to the present invention. Such system for communicating data includes a host data processing system, generally referred to by reference number 1, which includes a host system bus 2, a host central processing unit 3, host memory 4, and other host devices 5, all communicating across the bus 2. A network interface adaptor 6 is coupled to the host bus 2. The adaptor 6 is coupled to a transceiver 7 which is, in turn, connected to a network medium 8, such as coaxial cable, a twisted pair conductor, a fiber optic, satellite, wireless, or other communication medium. The network adaptor 6 is, in turn, connected to an adaptor memory 9, which is managed by the interface controller 6 or by the host CPU 3, depending on a particular implementation provided. The adaptor 6 also includes data path alignment logic 6A for aligning the transfer of data from the host system 1 into the adaptor memory 9 and vice versa, in which alignment is performed using a single access to the source, either the adaptor and host memory, per transferred double word. Of course, a wide variety of other configurations of these components could be implemented. For instance, the adaptor memory 9 may be connected directly to the host bus 2 with a data path aligner in between controlled by DMA logic in the adaptor 6. Also, multiple bus configurations might be utilized.

II. System Overview

FIG. 3 is a schematic diagram of a computer system including the network interface controller according to the present invention. The computer system includes a host system, including a host processor 10, host memory 11, and other host devices 12, all communicating through a host system bus 13, such as an EISA bus. The host system bus 13 includes address lines 25, which define a host system address space, and data lines 26 provided for eight bit channels of data with corresponding byte enable lines 27. Typically, for an EISA bus, there are 32 address lines establishing a host system address space of about 4 Gigabytes.

The network interface controller includes a network interface processor 14, implemented in one preferred system as an application specific integrated circuit designed to implement the functions outlined below using VERILOG design tools as known in the art (available from Cadence, Inc., San Jose, Calif.). The network interface processor 14 is coupled through appropriate buffers to the bus 13. The network interface processor 14 is also coupled to random access memory 15, BIOS ROM 16, and INFO EEPROM 17, a test port 18, an encode/decode chip 19, and a network transceiver 20. The network transceiver 20 is, in turn, coupled to a network medium.

A majority of the functionality is embodied in the network interface processor 14, including a data path aligner 14A for the transmit and receive paths as described in more detail below. In the preferred embodiment, all registers that are accessible across the bus 13 by the host system reside either in the processor 14, or in the RAM 15. If resident in the RAM 15, their access is managed by the network interface processor 14.

The RAM 15 is a primary resource on the network interface controller. This resource provides buffer memory outside the host address space used in the transmit and receive operations of the network interface. Details concerning the organization and utilization of this RAM 15 are described below.

The BIOS ROM 16 provides extension to the host system's basic input/output code through the network interface processor 14 during initialization. The addresses for the BIOS ROM 16 and the data from the BIOS ROM 16 are coupled to the network interface processor 14 across buses 21 and 22, respectively, which are also shared by the RAM 15.

The INFO EEPROM 17 stores critical adaptor specific data used by drivers, diagnostics, and network management software. This data is stored during the manufacturing process. During initialization of the interface controller, the contents of the EEPROM 17 are loaded into a prespecified area of the RAM 15 for use during operation.

Coupled to the interface processor 16 is an encode/decode chip 19, such as the National Semiconductor 8391 Manchester encode/decode chip. The signals coupled to the AUI connector are provided to allow use of a transceiver external to the board.

The transceiver 20 in a preferred system comprises either a thin Ethernet (coax/BNC) transceiver or a 10BaseT (Type 3/RJ-45) transceiver. Control signals for the transceiver 20 are produced on the network interface controller 14, using the conversion logic on the encode/decode chip 19.

A test port 18 is provided in a preferred system for use during manufacture and testing.

FIG. 4 provides a block diagram of the network interface processor 14 of FIG. 3, including functional blocks and data paths. There are numerous connections not shown having to do with the control of the various data flow paths. The interfaces illustrated include a RAM interface 50, a host bus interface 51, and a transceiver interface 52. The bus interface 51 is implemented for an EISA bus, and operates at times either as a master or as a slave on the bus. Each of the functional units in the implementation shown in FIG. 4 is described below.

A. EISA Slave Interface 54

The EISA slave interface 54 provides a path for the EISA host to access the registers and buffers managed by the network interface controller. The module contains configuration registers for the controller, and performs crude decoding of the EISA bus for the purpose of routing signals. The EISA slave interface 54 does not interpret any of the addressing of individual registers distributed throughout the controller.

In operation, the EISA slave interface continuously monitors the EISA address bus and determines when the configuration registers, memory mapped network registers, or BIOS ROM of the adaptor are being accessed.

In addition, for every memory slave cycle initiated by the EISA bus, the EISA slave interface will post a cycle request to the cycle arbiter 56. The cycle arbiter imposes wait states upon the host system until the request has been granted.

The EISA slave interface also provides a generic 32 bit bus interface to the remainder of the network controller. The generic nature of the interface allows for easy adaptation of the design to other bus types, such as the microchannel, without requiring redesign of the remainder of the chip.

Bits 14-2 of the EISA address bus are latched and pass through to other modules. The least significant two bits (1, 0) of the address are represented by 4 byte enables that are also valid throughout a data transfer cycle. Four 8-bit byte lanes make up the slave data channel. The data bus is actually a pair of unidirectional buses, one for writes and one for reads in a preferred system. The data write bus is wired in a multi-drop fashion to all modules that require connection to the EISA data bus through the slave interface. The read bus is multiplexed and masked in the RAM interface module 50. Write requests by the EISA bus can be held until they are acknowledged by the cycle arbiter 56. When a cycle is held, the EISA bus may be released from wait states while the cycle completes on the adaptor. If a second cycle is generated by the EISA bus while the first one is still pending, then the EISA bus will be held off with wait states until the pending write is performed. In this specific embodiment, pipelining of EISA reads is not supported.

The EISA slave interface also provides an interface to the EEPROM 17. This interface operates to transfer the contents of the EEPROM 17 into the adaptor memory after reset.

There are numerous registers in the EISA slave interface module 54, primarily related to configuration of the adaptor that conform to the EISA bus specification. These registers do such things as set up the adaptor's memory base address, the interrupt level, the transceiver type selection, and the BIOS ROM enable. The configuration registers also provide the host with a positive means of identifying the adaptor type and to globally disable the adaptor.

B. EISA Master Interface 55

The EISA master interface 55 handles requests from the upload DMA 57 and download DMA 58 for performing bus master operations across the EISA bus. The EISA master interface 55 autonomously arbitrates between pending upload and download requests, because of the EISA bus disallowing mixed reads and writes while performing burst transfers, used by the DMA operations of the preferred embodiment.

The bus master transfers are always initiated by either the upload DMA 57 or the download DMA 58. The transfers may be terminated by either the DMA modules upon completion of a transfer, or by the EISA master interface upon preemption by another arbitrary device on the EISA bus.

Thus, the function of the EISA master interface 55 is to arbitrate for access to the EISA bus when transfer requests are pending from either or both of the upload DMA 57 and the download DMA 58. The EISA master interface 55 performs the signalling necessary to establish first transfers with address slaves on the bus. It also ensures compliance with the EISA bus definitions.

This module also converts real mode segment:offset addresses to 20 bit linear addresses when enabled by the adaptor mode logic 59.

C. Master/Slave Union Module 53

The master/slave union module 53 provides for sharing of connections to the EISA bus by the EISA master interface 55 and the EISA slave interface 54. This union module 53 consists primarily of a series of 2:1 multiplexers.

D. Interrupt Controller Module 60

The controller also includes an interrupt controller module 60. The interrupt controller module 60 implements various interrupt and indication functions, including masking and enable/disable mechanisms. Interrupt signals are generated by various modules within the controller, and are routed to the interrupt controller module 60. The interrupt controller module 60 then passes the interrupt signals through various enables and masks before OR-ing them together and driving the result onto the host bus.

The interrupt controller module 60 does not detect interrupt worthy events or acknowledge the interrupts passed to the host. It includes a number of adaptor resident registers utilized in the interrupt handling functions.

E. Adaptor Mode Module 59

The adaptor mode module 59 provides a number of functions including setting various basic operating modes of the controller, and reporting status of various conditions of the controller. The adaptor module 59 also establishes the base address of a window register used for diagnostics by the host system. Furthermore, the .adaptor mode module 59 generates reset functions for the adaptor. Also, this module provides the MAC ID register which identifies the media access controller implemented by the device, for communication to various modules within the controller and to the host system.

F. Cycle Arbiter Module 56

The cycle arbiter module 56 is responsible for distributing access to the adaptor's RAM resident and ASIC resident registers through the RAM interface 50 among various requestors. It functions to allow timely access to the RAM by modules that are most in danger of suffering an overrun or underrun condition in response to a priority scheme.

G. Multicast Comparator Module 61

The controller illustrated in FIG. 2 also includes a multicast comparator module 61. When enabled by the adaptor mode module 59, the multicast comparator module 61 performs a bit by bit comparison of a received frame's destination address field with contents of the multicast address table. The multicast address table is established by the host and stored in RAM 15. A mismatch during this compare, coupled with neither an individual address nor a broadcast address match, will result in the rejection of an incoming frame.

Thus, the multicast comparator module 61 monitors the activity of the Ethernet receiver module 62 and the receive DMA module 63 to determine when a new frame is being received: Each byte that is received by the Ethernet receiver 62 and presented at the parallel interface 64 of the receiver, is shadowed by the multicast comparator module 61. These bytes are then compared against valid entries in a multicast address table accessible by the multicast comparator 61.

The multicast comparator 61 does not establish or maintain the contents of the multicast address table. However, the module detects the host accesses to the table and supplies appropriate redirection offsets to the RAM interface module 50.

H. Statistics Controller Module 65

The preferred system also includes a statistics controller module 65. This module monitors activity of various other modules within the controller, most particularly the Ethernet transmitter module 66 and the Ethernet receiver module 62, and updates statistics maintained in RAM 15 as applicable events occur.

I. Download DMA Module 58

The download DMA module 58 is responsible for issuing requests for bus master downloads of data from the host system to the adaptor memory. This data is then deposited within the adaptor's onboard transmit data buffer for either immediate or future transmission.

As soon as buffer descriptors are defined and one of the transmit data buffers becomes available, as described below, the download DMA module submits requests for download bus master operations to the EISA master interface 55. The download DMA module 58 performs byte alignment, including any required packing and unpacking to align the data as implied by the respective starting addresses of the host and the adaptor as described below with respect to FIG. 11.

The download DMA module 58 also includes logic for maintaining the transmit descriptor ring buffer within the adaptor's RAM. The download DMA module 58 generates an interrupt in the appropriate mode to indicate completion of the download operation. Also, the download DMA module 58 informs the transmit DMA module 67 when it is time to begin transmission.

J. Transmit DMA Module 67

The transmit DMA module 67 operates to fetch bytes from the transmit descriptor buffer, the transmit data buffer, or both, as described below, when directed to do so by the download DMA logic 58. The fetched bytes are then presented in sequence to the Ethernet transmitter module 66.

Thus, the transmit DMA module 67 functions to read the contents of the transmit descriptor ring buffer to determine the extent of immediate data, and the length of the overall frame to be transmitted. If a frame specified does not match the specifications for the network, for instance, is shorter than the 802.3 minimum, and the adaptor is so enabled, this module will supply additional bytes of undefined data to the Ethernet transmitter module 66 as padding.

Collision retries in the CSMA/CD network are handled by the transmit DMA module 67. When a collision is indicated by the Ethernet transmitter 66, the transmit DMA module 67 will resubmit the same frame by reinterpreting the frame descriptor in the buffer.

If enabled, and when the transmit complete condition is satisfied, a transmit complete interrupt is generated for handling by the interrupt controller 60 in the transmit DMA module 67.

The transmit DMA module 67 also stores appropriate frame status in the transmit descriptor ring buffer of the adaptor upon completion of transmission.

The transmit DMA module 67 also detects underrun conditions, when a shortfall of data available for transmission occurs.

K. Ethernet Transmitter Module 66

The Ethernet transmitter module 66 provides media access control function associated with transmission for an 802.3 standard network. This module accepts parallel data-bytes from the transmit DMA module 67 and applies the 802.3 access rules, and supplies serial data to the external encoder/decoder chip.

L. Ethernet Receiver Module 62

Similarly, the Ethernet receiver module 62 is an essential 802.3 implementation. This module accepts serial data from an external encoder/decoder, applies the 802.3 rules to the data and presents the data in parallel form for use by the receive DMA module 63. Thus, the Ethernet transmitter 66 and Ethernet receivers perform the standard CSMA/CD functions.

M. Receive DMA Module 63

The receive DMA module 63 is a functional complement to the transmit DMA module 67. This module is responsible for accepting parallel data bytes on the Ethernet receiver 62 and depositing them in the adaptor's receive ring buffer.

The receive DMA module 63 is responsible for assembling bytes from the Ethernet receiver into 32 bit words prior to storage in the adaptor's RAM. At completion of frame reception, the frame's status and length are deposited within the receive ring buffer for use by the host system.

The receive DMA module 63 is also responsible for establishing and maintaining of the receive buffer ring within the RAM of the adaptor as described in detail below. Furthermore, the positioning of the "LOOK-BUF" register allowing the host to view received data, as mentioned below, is handled by the receive DMA module 63.

The receive DMA module 63 also handles interrupt indications under appropriate conditions.

N. Upload DMA Module 57

The upload DMA module 57 performs data transfers from the receive buffer through the RAM interface 50 to the host system including data alignment as described below with respect to FIG. 15. Thus, the receive ring buffer is managed by the receive DMA module 63 and interpreted by the upload DMA 57. Actual bus master transfers are carried out by the EISA master interface module 55.

The upload DMA module 67 interprets data structures deposited in the receive ring buffer by the receive DMA module 63 including the location and length of a received frame. It also reads the transfer descriptor which is defined by the host system to determine how many bytes of the frame to transfer, and where in the host memory to transfer the frame.

The upload DMA module 57 requests bus master cycles from the EISA master interface module 55 in response to valid transfer requests deposited by the host.

The upload DMA module 57 also utilizes an interlock between the receive DMA module 63 and the upload DMA module 57, to reduce the transfer rate to the host system to prevent "getting ahead" of the frame being received through the receive DMA module 63. Finally, this module generates interrupts indicating completion of a transfer for use by the host.

O. RAM Interface Module 50

The RAM interface module 50 provides multiplexers and masks for various functions involved in addressing the RAM. The module multiplexes the various address and data sources together to form parameters for RAM access cycles. This module 50 is responsible for gathering up data from the various other modules on the controller that can be read by the host system. Additionally, this module applies a mask to the data to force unused upper bits to a zero, and latches data words for multicycle reads.

P. JTAG Module

Also included in the controller, though not shown, is a JTAG module which implements a state machine as specified in IEEE standard 1149.1-1990, May 21, 1990. This module provides a scan test of the ASICs pins for use during manufacture.

Q. The Autonomous Access Address Bus Definition

The multi-cast comparator 61 statistics controller 65, download DMA 58, transmit DMA 67, receive DMA 63, EISA slave interface 54, and upload DMA 57 all require autonomous access capabilities through the RAM interface 50 to the adaptor's RAM. The autonomous accesses are those that occur independently of any cycles that may be occurring on the host bus.

This requirement requires the capability to generate and communicate address information for use by the RAM interface 50. In the case for the receive DMA 63, transmit DMA 67, and download DMA 58, the capability is implied by the DMA logic which drives offset buses. Similar offset buses dedicated to the autonomous accesses are provided for use by the statistics controller 65, upload DMA 57, and multi-cast comparator 61.

FIG. 4A schematically defines the structure of the autonomous access address buses. The various functional modules are given like reference numbers, as provided in FIG. 4.

The multi-cast comparator 61 drives the multi-cast offset bus [6:2] to supply a variable offset to the RAM interface 50 for addressing individual locations within the multi-cast address table. A valid value is presented during the associated autonomous access cycle.

The statistics controller 65 drives the statistics offset bus [7:2] to supply a variable offset to the RAM interface 50 for addressing individual locations within statistics region of the adaptor's RAM. A valid value is presented during the associated autonomous access cycle.

The upload DMA 57 drives the upload DMA offset bus [14:2] to supply a variable offset to the RAM interface 50 for addressing individual locations within a receive buffer ring. A valid value is presented during the associated autonomous access cycle.

The download DMA 58 drives a download DMA offset bus [12:2] to supply a variable offset to the transmit buffer/transmit descriptor region of the RAM during autonomous cycles. Two select signals generated by the download DMA logic 58 are used to distinguish between the two RAM regions. Also, the download DMA logic 58 generates a download DMA byte enable [3:0] to indicate which byte lanes of the 32 bit data bus extending from download DMA 58 to the RAM interface 50 contain valid data. The valid value is presented during the associated. autonomous cycle.

The receive DMA 63 drives a receive DMA offset bus [14:2] to convey a variable offset within the 22K byte receive buffer region of the RAM.

Finally, the transmit DMA logic drives a transmit DMA offset bus [12:2] to supply a variable offset to the transmit buffer/transmit descriptor region of the RAM during autonomous cycles. The two select signals generated by the transmit DMA 67 are used to distinguish between the two RAM regions.

III. Transmit and Receive Data Flow

Figure 5:
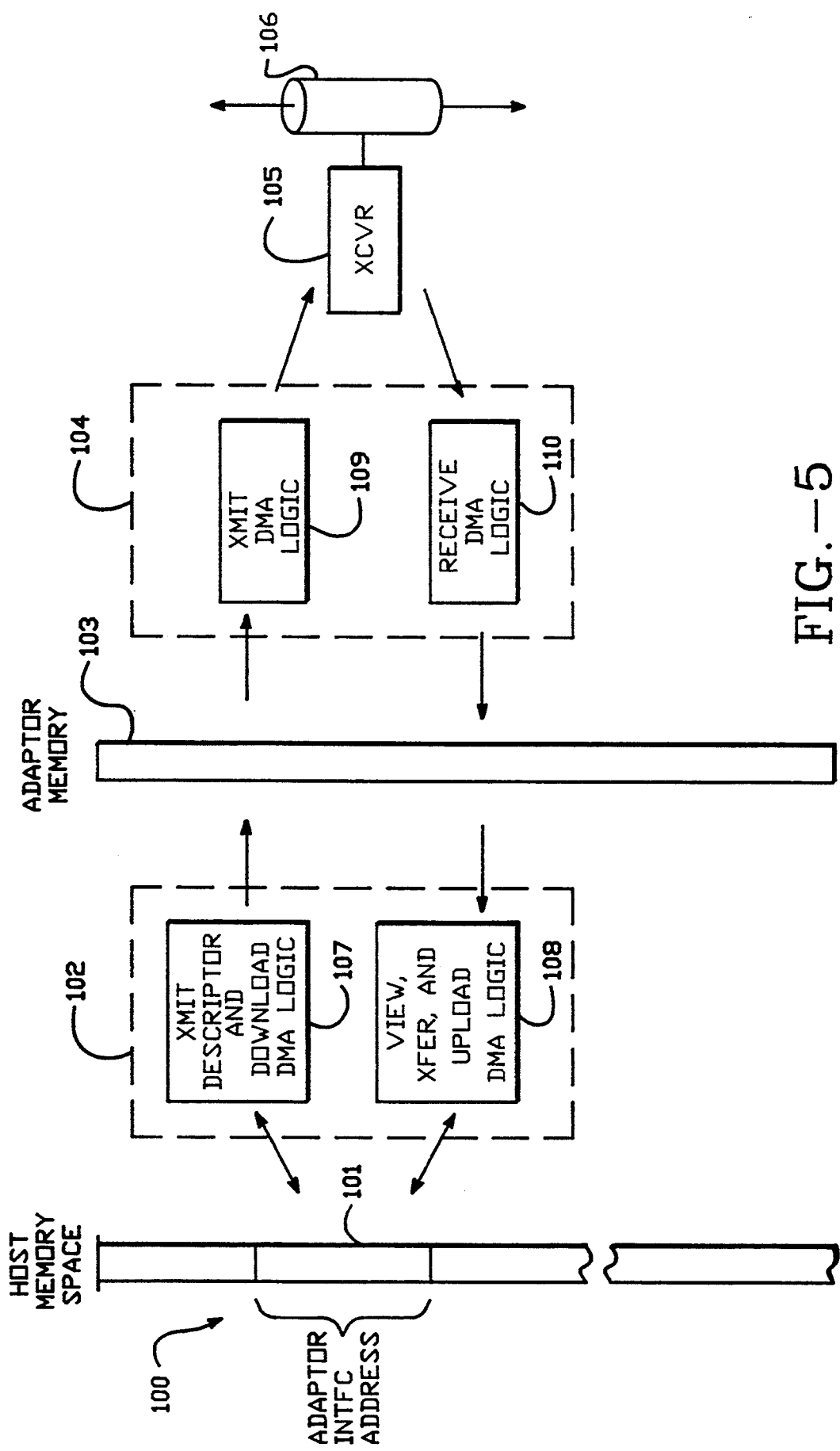
FIG. 5 is a schematic diagram illustrating data flow from the host memory space through adaptor memory to the network, and visa-versa, according to the present invention.

FIG. 5 provides a heuristic data flow diagram of an adaptor according to the present invention emphasizing the host interface, the adaptor memory and the network interface data flow for transmission and reception.

As mentioned above, the host system will include a host memory space (generally 100) defined by the addresses on the host bus. A pre-specified block 101 of the host memory space is set aside for the adaptor interface addresses. The adaptor includes host interface logic 102 which is responsive to accesses across the host bus within the adaptor interface address block 101. Also in the adaptor is a host independent memory 103. The host interface logic operates to map the transfer data between the specified block 101 Of addresses and the independent memory. The adaptor also includes network interface logic 104 which is coupled to the adaptor memory. The network interface logic manages transfers of data from buffers in the independent memory 103 and the network transceiver 105. The network transceiver 105 then supplies the data onto the network medium 106.

The host interface logic includes a transmit descriptor logic and a download DMA logic (generally 107) used in the transmit process, and view logic, transfer descriptor logic, and upload DMA logic (generally 108) used in the receive process. These modules basically manage communication of data between the independent memory 103 and the host in response to reads/writes by the host system to the adaptor interface address block 101. This relieves the host of any address translations or buffer management functions for the transmit and receive operations.

The network interface logic 104 includes transmit DMA logic, (generally 109) and receive DMA logic (generally 110). The transmit DMA logic 109 is responsive to descriptors stored in the adaptor memory 103, as described below, for moving data out of the independent adaptor memory 103 to the network transceiver 105. Similarly, the receive DMA logic 110 is responsible for moving data from the transceiver 105 into the independent adaptor memory 103. Thus, all communications of data from the network medium 106 are coupled directly into host independent memory 103. Communications from the host independent memory 103 are then controlled through the host interface logic 102 in response to a memory mapped region in the host memory space, greatly simplifying the protocol software necessary to communicate with the network.

Figure 6:
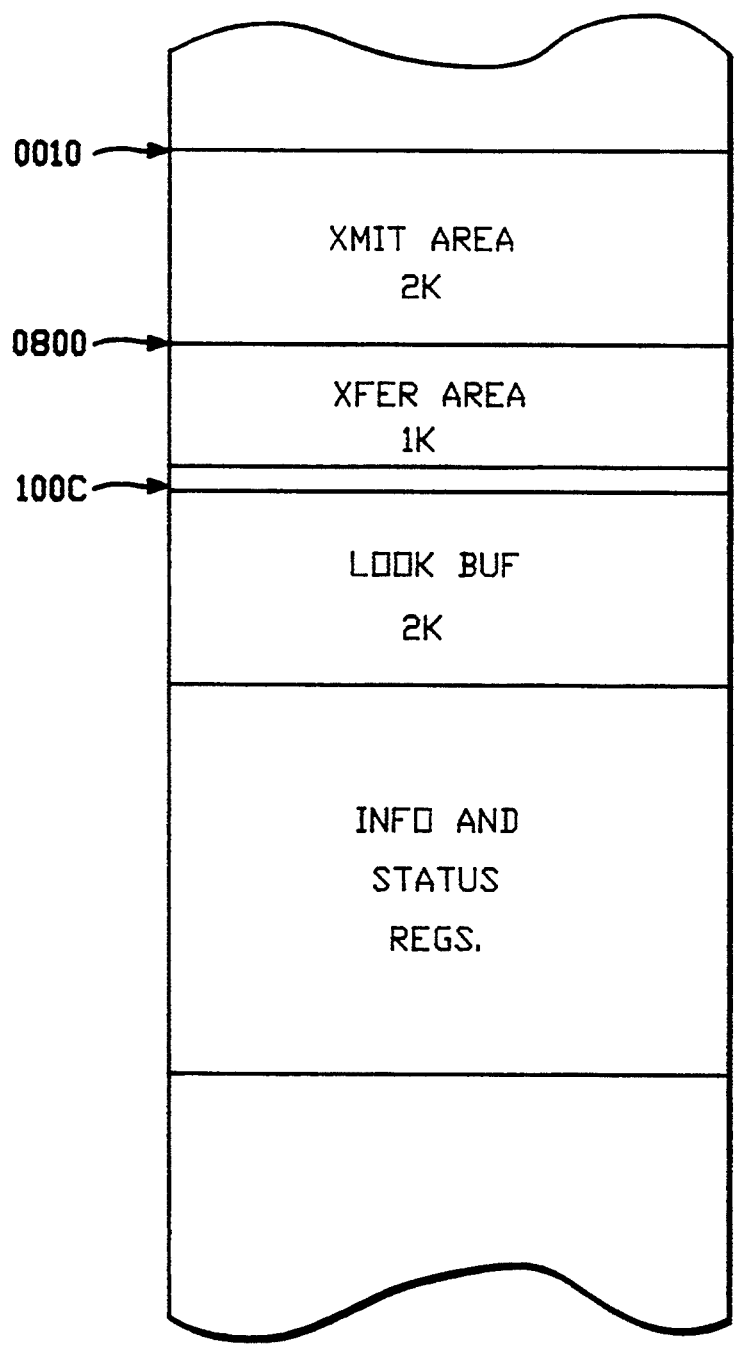
FIG. 6 is a map of the host system address space used for transmitting and receiving data according to the present invention.

FIG. 6 provides a simplified map of the host address block 101 used by the host interface. The addresses within this block appear to the host like memory mapped registers in a continuous 8K block of the host address space in a preferred system.

For the EISA embodiment, "registers", or mapped areas, in the block 101 are located on double word address boundaries, thus, addresses are a multiple of four. Many of the "registers" occupy several double words (as many as 509) of memory space.

Although the "registers" are memory mapped to an arbitrary pre-specified block of host address space, none of the reads or writes performed by the host system to these registers actually directly access the adaptor memory. Rather, the accesses to the memory mapped space are interpreted by the host interface logic 104 transparent to the host system. Thus, the memory in the adaptor is independent of the host address space and of host management. FIG. 6 provides an overview mapping of the host address space used for accessing these registers. The registers include primarily a transmit area register (XMIT AREA) at offset 0010 (hex), a transfer area register (XFER AREA) at offset 0800 (hex), and a look buffer (LOOKBUF) at offset 100C (hex). Various status, statistics, information, and indication registers are distributed throughout the balance of the area.

The XMIT AREA register is used by the host to write transmit descriptors into the adaptor. The transmit descriptors are described in more detail below, but include data that identifies data to be compiled and transmitted as a frame, and may include immediate data. The XMIT AREA at offset 0010 (hex) is approximately 2K bytes in size. This data is mapped into a transmit descriptor ring in the independent adaptor memory as described below.

The XFER AREA at offset 0800 (hex)in the adaptor interface host address block is a buffer of approximately 1K byte through which transfer descriptors are written into the independent memory of the adaptor. The LOOKBUF area at offset 100C (hex)is a buffer of approximately 2K bytes providing a read only window into a receive ring buffer within the host independent adaptor memory. More details of the receiver process are provided in the above cross-referenced application entitled NETWORK INTERFACE WITH HOST INDEPENDENT BUFFER MANAGEMENT.

FIG. 7 provides a map of the host independent memory on the adaptor. This memory is organized into a transmit data buffer at offset 0 of approximately 3K bytes, a transmit descriptor ring at offset 0C00 (hex) of approximately 5K bytes, a receive buffer ring at offset 2000 (hex) of approximately 22K bytes, and a transfer descriptor area at offset 7800 (hex) of approximately 1K bytes is provided in the independent memory. The last three areas of memory include adaptor information, network statistics, and multicast address tables for use by the adaptor.

In the preferred system, the adaptor uses 32K bytes of static RAM for the transmit buffers, receive buffers, control structures, and various status and statistics registers.

A. The Transmit Process

The transmit data buffer occupies 3K bytes as mentioned above. This region is divided into two 1.5K buffers. Only the data that are downloaded to the adaptor via bus master transfers are stored in these buffers. The controller will use both the contents of the transmit data buffer and the immediate data portion of the transmit descriptors, when encapsulating a frame for transmission. The adaptor automatically alternates the use of the buffers after choosing the buffer closest to the base of the memory as the power up default.

The transmit buffers are shared by the download DMA logic and the transmit DMA logic. The transmit DMA logic may switch from buffer 0 to buffer 1 and back again freely. The only restriction being the availability of transmit data as defined by the transmit start threshold register. The transmit DMA module switches from one buffer to the other whenever it has completed a transmission. The buffer switch occurs regardless of whether or not the transmission was successful and regardless of whether or not bus master download data were used in the preceding transmission.

The download DMA module may only switch from one buffer to the other, if the buffer it is going to switch to is not being used by the transmit DMA module. Download DMA will attempt to switch from one buffer to another every time it completes processing of a transmit descriptor as described below, regardless of whether or not any bus master operations were called for in the preceding descriptor. However, it will not change to a buffer that is in use by the transmit DMA module.

Transmit descriptors define frames that are pending transmission, and hold the status of frames that have been transmitted. These descriptors are of variable length and are arranged in a sequential fashion around a 5K byte ring buffer as mentioned above. The first entry of the descriptor must align on a double word boundary. FIG. 8 illustrates the transmit descriptor data structure.

The bulk of the contents of an entry into the transmit descriptors region is copied verbatim from the data supplied by the host processor via the XMIT AREA illustrated in FIG. 6. However, in order to comply with the format requirements of the XMIT PROT ID and XMIT FRAME STATUS registers and to supply sufficient information for frame transmission and buffer management; one value must be relocated and several must be deposited automatically.

The host processor's writes to the XMIT AREA are offset automatically by the adaptor such that the first value written—XMIT PROT ID and XMIT REQ HANDLE—end up in the fifth 32 bit word location (offset 10 (hex)) in the next available data structure in the ring. This means that the XMIT REQ HANDLE value is written by the host to the location reserved for the MACID value. Immediately after the XMIT REQ HANDLE value is written to the adaptor's RAM, the adaptor must copy the contents of the least significant 16 bits of the fifth 32 bit word location to the most significant 16 bits of the fourth 32 bit word location. After copying XMIT REQ HANDLE, the adaptor will retrieve the MACID value from the MACID register and write that to the location vacated by XMIT REQ HANDLE. Later, after frame transmission, the least significant 16 bits of the fourth 32 bit location (offset C (hex)) will be updated with the transmit frame's status.

The NEXT DESCRIPTOR POINTER entry may be updated by the adaptor any time after the XMIT BUFFER COUNT and XMIT IMMED LEN values have been written to the adaptor. Because the data written to the XMIT AREA register must be written in a precise order to exact locations, the writes of these two values can be easily detected and used for the descriptor size calculations required to determine the start of the next descriptor without having to retrieve the values from RAM.

Finally, once the last XMIT DATA LEN value has been written to the adaptor, the frame length can be calculated and deposited in the FRAME LENGTH position of the data structure. This value is also copied to the XMIT FRAME LENGTH register in the controller chip for immediate use by the host.

The next several paragraphs define each of the fields of the transmit descriptor data structure.

The NEXT DESCRIPTOR POINTER value points to the first word of the next descriptor. This value is updated immediately after the host reads XMIT QUEUE STATUS. NEXT DESCRIPTOR POINTER being defined does not necessarily imply that the location pointed to contains a valid descriptor. It merely indicates where the next valid descriptor may be found once it is defined.

The FRAME LENGTH field is computed and updated by the adaptor. The frame length is calculated by summing all of the XMIT DATA LEN values and the XMIT IMMED LEN value. The resulting sum is the total number of bytes in the transmit frame. If the sum is less than the 802.3 minimum frame length, then the sum will be set to the minimum frame length value. The sum is-written to the FRAME LENGTH line of the transmit descriptor and is also made available to the host via the XMIT FRAME LENGTH register.

The XMIT FAILURE field contains the error code that is made up of the status bits gathered from the Ethernet transmitter after the completion of transmission. This field is mapped to the XMIT FAILURE register for host access.

The XMIT REQ HANDLE value is interpreted by the transmit DMA controller to determine whether or not to generate an indication upon completion of the transmission attempt(s) for the associated frame. If the field is non-zero, an indication will be generated. Also, the frame's entry in the transmit descriptor ring will be maintained until the host has had an opportunity to examine the transmit status. The XMIT REQ HANDLE, XMIT STATUS, XMIT PROT ID, and the MACID fields are all made available to the host when an indication is generated. If XMIT REQ HANDLE is a zero, then the transmit descriptor queue entry is discarded after transmission without notifying the host in any way. Transmit underrun conditions are posted regardless of a zero XMIT REQ HANDLE.

The XMIT STATUS field contains the transmit status for the associated frame. The contents of this field are updated immediately after the transmission attempt(s). The return codes are defined in the XMIT STATUS register definition.

The XMIT PROT ID value in this field is merely maintained within the queue for use by the host upon completion of the transmission to identify the particular protocol responsible for the frame. It allows simultaneous activity of multiple protocols. Together XMIT PROT ID and XMIT REQ HANDLE uniquely identify a frame passing through the adaptor.

The MACID, like XMIT PROT ID, is maintained within the queue for use upon completion of the transmission. However, the host does not write this value to the adaptor via the XMIT AREA register. Rather, the host stores this value once in the MACID register and then depends upon the adaptor to deposit this value into the descriptor data structure after XMIT REQ HANDLE has been copied to its final position.

The contents of the XMIT BUFFER COUNT field are supplied by the host via a write to XMIT AREA. This field specifies the number of buffers within the host's memory that are used to make up the transmit frame. Each of the buffers is transferred in the order listed from the host's memory to the adaptor's transmit data buffer as soon as one of the two transmit data buffers becomes available. If XMIT BUFFER COUNT is zero, then no bus master operations will be performed for this frame.

The XMIT IMMED LEN field, defined by a write from the host to XMIT AREA, specifies the number of "immediate" data bytes that will be supplied by the host. If this field is zero, then the next 32 bit word location will contain the first host data buffer descriptor and the entire frame will be transferred to the adaptor via bus master cycles. The XMIT IMMED LEN value will not necessarily be a multiple of four. The location of the first host data buffer descriptor is determined as follows:

DESCRIPTOR OFFSET=((XMIT IMMED LEN+3) & fffc(hex))+18(hex).

The variable length IMMEDIATE DATA field contains the immediate data deposited to the adaptor by the host using memory writes to XMIT AREA. This field may vary in length from 0 to 1,514 bytes. Immediate data is inserted into a transmit frame between the preamble and the transmit buffer data (if any) by the adaptor during transmission. Generally, immediate data is made up of the destination and source addresses and any protocol-specific header data. It is reasonable, however, for the entire transmit frame to be considered immediate data. This would make it unnecessary for the adaptor to perform any bus master operations to fetch the remainder of the transmit frame. If XMIT IMMED LEN is zero, then this field is skipped and the entire frame is assumed to reside in host memory resident data buffers. If XMIT IMMED LEN does not specify an integral number of double words, then the host may round up to the nearest multiple of 4 and write up to that number of bytes. The extra bytes, beyond XMIT IMMED LEN, will be ignored and not included as part of the transmitted frame.

The XMIT DATA LEN field, one of two entries per host data buffer descriptor, defines the number of bytes in the associated host buffer. This value need not be a multiple of four.

The 32 bit XMIT DATA PTR value is the physical starting address of the associated host data buffer. This value need not be a multiple of four.

FIG. 9 illustrates the network interface logic and host interface logic used in managing the transmit data buffer and transmit descriptor ring buffer in the independent memory on the adaptor. On the host interface side, the logic includes host descriptor logic 150 and download DMA logic 151. The host descriptor logic 150 and download DMA logic 151 are coupled to the host address space through the transmit "registers" including the XMIT AREA register, the XMIT COMPLETE THRESH register, the XMIT FAILURE register, the XMIT FRAME LENGTH register, the XMIT FRAME STATUS register, the XMIT PROTID register, the XMIT QUEUE STATUS register, and the XMIT START THRESH register. Details of these registers are described below.

The descriptors illustrated in FIG. 8 are stored in the transmit descriptor area of the host independent RAM on the adaptor by host writes to the XMIT AREA address block. Three different processes act upon entries in the descriptor queue. The host writes to initially create transmit descriptors, bus master downloads to move buffer data from host memory to the transmit data buffer and transmission of described frames on the network. The first two processes occur within the download DMA logic 151 and the host descriptor logic 150. Transmission is performed by the transmit DMA logic 155. During the course of adaptor operations, the number and status of descriptors in the transmit descriptor ring buffer 152 will vary according to the relative speeds of the host write, download, and transmission processes.

Two variables within the download DMA logic 151 helped describe the status of the transmit descriptor queue. ZERO DOWNLOADS PENDING indicates that there are no complete frame descriptors yet to be processed by the download DMA logic 151 for download. The ZERO FRAMES RESIDENT variable indicates that there are no descriptors which have been already processed by the download process, but are yet to be transmitted.

Each of the three processes that make up the transmission mechanism maintains its own set of pointers to the descriptor queue.

The host descriptor logic 150 generates pointers for the transmit descriptor ring buffer 152 on the adaptor memory, which identify the current position of host accesses for writing descriptors in the transmit descriptor ring buffer 152. These pointers are designated the current host descriptor pointer CHD, and the host write pointer HW. The current host descriptor pointer CHD points to the base address of a descriptor currently being written, or expected to be written by the host. The host write pointer HW points to the location within the current descriptor (pointed to by the CHD pointer) to which the host is expected to write next. That is, the HW pointer predicts the offset within the XMIT AREA address block at which the host will be writing to complete the current descriptor.

The download DMA logic 151 generates 3 pointers, and a buffer select signal, while managing downloads from the host system into the transmit data buffers XMIT DATA BUF0 153 and XMIT DATA BUF1 154. The pointers generated by the download DMA logic 151 include the current download descriptor pointer CDD which points to the base address of a descriptor that is currently being processed by the bus master download DMA logic 151. The second pointer generated by the download DMA logic includes the download data pointer DD which points to the location within the current transmit data buffer (either XMIT DATA BUF0 or XMIT DATA BUF1) to which the download process is writing data. The third pointer generated by the download DMA logic 151 includes the current download buffer CDB pointer. The CDB pointer points to the buffer descriptor within the transmit descriptor pointed to by the CDD pointer, in which the specification of the buffer in host memory subject of a current download process resides.

The download DMA logic also selects the current transmit data buffer 153 and 154 to which the download DMA logic transfers data in the bus master operation as heuristically illustrated by signal BUF1/0. The transmit DMA logic 155 generates three pointers for the transmission process. These pointers include the current transmit descriptor CXD pointer, which points to the base address of the descriptor in the transmit descriptor ring buffer 152 currently being processed by the transmit logic 155. The transmit read XR pointer indicates the location within the current descriptor or current transmit data buffer (153 or 154) from which the transmission process is reading data to be transmitted.

The XMIT TAIL pointer (XT) points to the back end of the queue. The XT pointer points to an older descriptor in the transmit descriptor ring buffer 152 than the CXD pointer when there are frames that have completed transmission, but have not yet had their status information read by the host system.

The preferred system operates in two modes relative to generating indications to the host of the completion of a transmission. The preceding paragraphs described the data structures associated with host write, bus master download, and transmission processes when a XMIT COMPLETE ON DOWNLOAD variable is false and the indication is generated when the transmission is complete, or when XMIT COMPLETE THRESH (described below) is met. When XMIT COMPLETE ON DOWNLOAD is true, the download DMA logic 151 is also responsible for keeping track of the frames for which status has not been read. In this mode, the host receives the transmit complete indication for a frame upon download of the frame, so it is possible that the frame can be transmitted before the host is able to respond to the indication. This condition allows the XMIT TAIL pointer to no longer define the oldest useful entry in the descriptor ring buffer. Therefore, a frame status process is necessary. The frame status pointer FS points to the base address of the oldest descriptor for which status has not yet been read by the host, in this mode of operation. Since the FS pointer is related to the transmit process, it is illustrated heuristically in the transmit DMA logic 155 in FIG. 9. In the preferred system, however, it is logically coupled with the download DMA logic 151.

The transmit DMA also selects the current transmit data buffer 103 or 104 from which a current transmit frame is being composed, as indicated heuristically by the signal BUF0/1.

B. The Transmit Data Path Logic

The transmit data path is implemented primarily in the download DMA module 58 in the preferred implementation. The key components of a preferred implementation of the present invention include data path arithmetic logic and the data path aligner described with reference to FIGS. 10 and 11, respectively.

Figure 10:
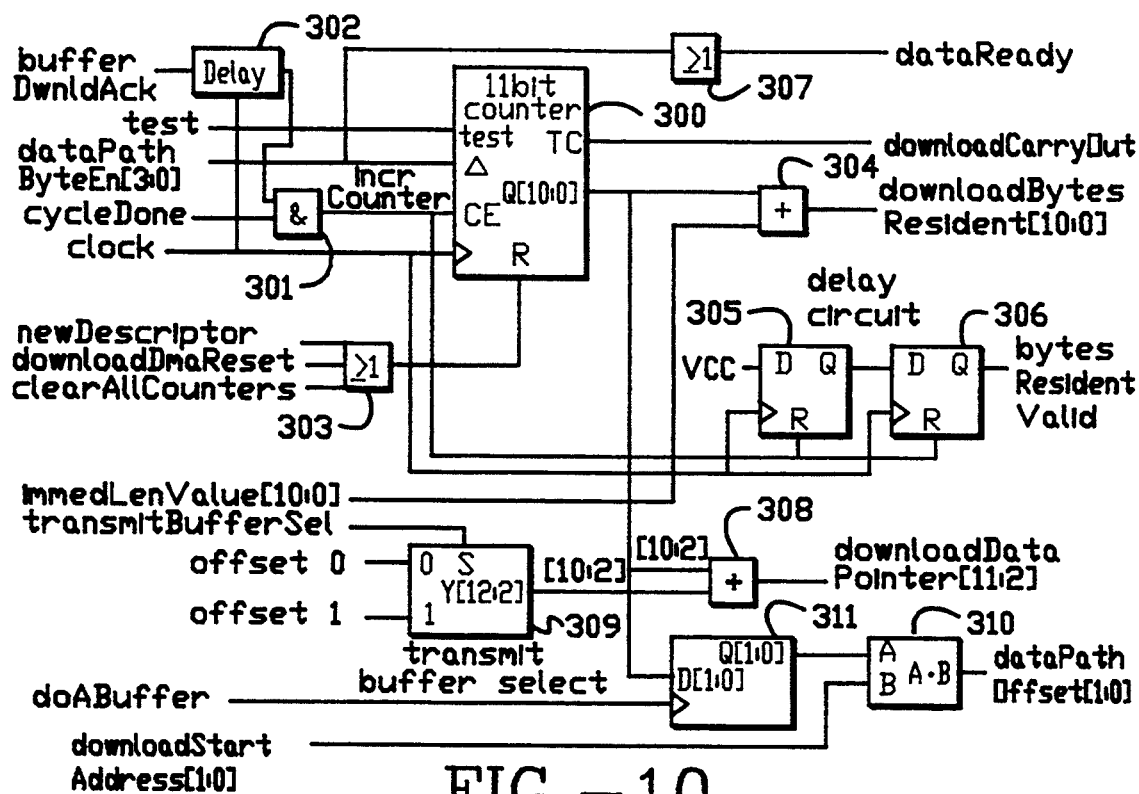
FIG. 10 is a logic diagram illustrating the data path arithmetic used in the transmit function for the network interface controller of FIG. 4.

FIG. 10 illustrates the basic logic of the data path arithmetic. This logic is founded primarily on 11 bit counter 300. The 11 bit counter 300 includes a test input, a delta input, a counter enable CE input, a clock input, and a reset R input. The outputs of the 11 bit counter 300 include a carryout TC, and a counter output Q [10:0]. The test input is used for testing unrelated to the present invention. The delta input is driven by the download DMA byte enable [3:0], and sets an increment amount for the counter 300 between 1 and 4, based upon the number of bytes in the 32 bit bus that are active in the download process.

The counter enable CE input is driven by the output of AND gate 301. The inputs to the AND gate 301 include the cycleDone signal, and the output of delay circuit 302. The delay circuit 302 receives as inputs the clock and the buffer download acknowledge bufferDwnAck signal. The cycleDone signal is asserted during the last clock of a transfer cycle, and is used in concert with other control signals to generate read and write strobes within the download DMA. The bufferDwnAck signal is a cycle acknowledge signal for buffer download autonomous accesses on the adaptor. It is asserted in response to a buffer download request. The delay circuit 302 operates to insure that it stays true for at least as long as the cycleDone signal to insure proper incrementing of the counter.

The cycleDone signal is generated during the last clock of a transfer cycle. It is the basis for incrementing the counter 300 by the amount indicated by data path byte enable [3:0].

The clock input 300 is driven by the system clock. The reset input is driven by OR gate 303. The inputs to the OR gate include a newDescriptor signal indicating when a new descriptor is being processed by the download buffer, a downloadDmaReset signal, and a clearAllCounters signal for clearing counters on the adaptor. The output of the counter 300 is supplied on an 11 bit line Q[10:0]. This output is supplied to adder 304. The second input to the adder 304 is the immediate length value immedLenValue [10:0] which is read from the current descriptor. The sum of the immediate length value and the output of counter 300 is supplied as the downloadBytesResident value [10:0].

Figure 11:
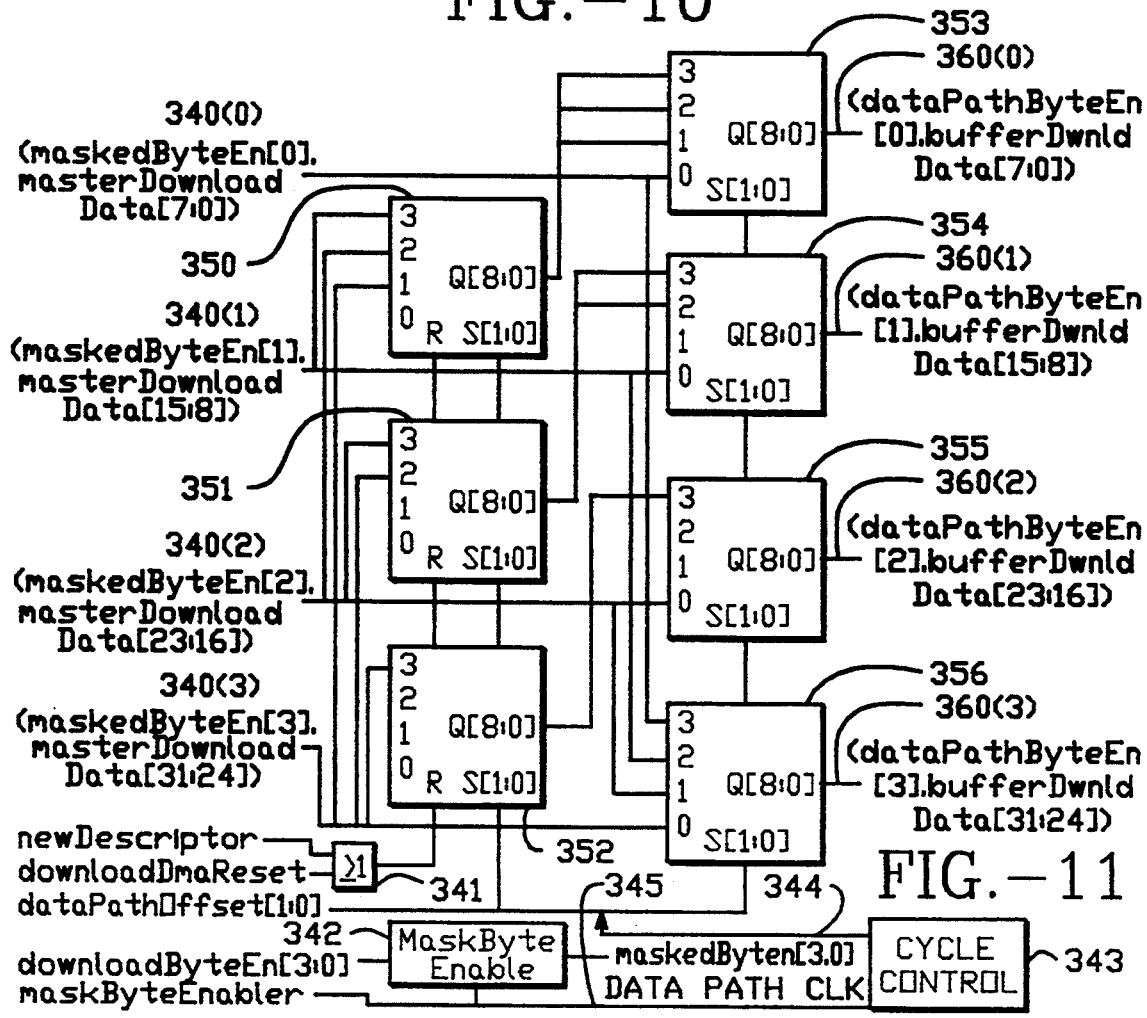
FIG. 11 is a schematic diagram of the data path aligner in the transmit path for the network interface controller of FIG. 4.

The data path arithmetic in FIG. 11 also illustrates generation of the bytesResidentValid signal. This signal is generated by a sequence of D-type flip-flops 305, 306 which cause the bytesResidentValid signal, which is normally true, to go inactive for three clocks whenever the counter changes value. This allows for the download bytesResidentValue [10:0]to settle out of the adder and propagate through a comparator in the transmit start control logic described below. Thus, the D-type flip-flops 305, 306 have a reset input which is driven by the output of AND gate 301, and a clock driven by the clock signal. Thus, these flip-flops are reset every time the counter 300 is incremented.

This logic is also used to generate a dataReady signal at the output of OR gate 307. The inputs to this OR gate 307 are the dataPathByteEn signal [3:0]. Thus, the dataReady signal is asserted whenever a valid dataPathByteEn signal is generated.

A downloadCarryOut signal is generated for test purposes by the carryout signal TC of the counter 300.

This logic is also used to generate a downloadDataPointer [11:2]. The downloadDataPointer is generated at the output of adder 308. The inputs to the adder 308 include bits [10:2] of the output Q of counter 300, and the output of the transmit buffer select MUX 309. The inputs to the transmit buffer select MUX 309 include the offsets of the two transmit data buffers which are selected in response to transmit buffer select signal at the select input.

Finally, this logic generates a dataPathOffset signal [1:0] at the output of the subtractor 310. The subtractor generates a difference between signals A and B supplied at its inputs. Signal A is supplied at the output of latch 311. The latch 311 latches the two least significant bits [1:0] of the output Q of the counter 300. These two bits are latched in response to the doABuffer signal. The doABuffer signal is a command supplied to the buffer download logic to perform a bus master download of a buffer described in a transmit descriptor. Thus, these two bits are latched at the start of a download operation. The corresponding bits in the 32 bit download start address generated in response to the XMIT DATA PTR value from the transmit descriptor, is supplied to input B and subtracted from the value at input A to determine the data path offset for the buffer transfer.

FIG. 11 illustrates the data path aligner in the download DMA logic. The data path aligner receives its inputs for byte lines 340(0), 340(1), 340(2) and 340(3). Each includes eight data bits from the master download data bus, and a masked byte enable signal generated by mask byte enable block 342. The inputs to the mask byte enable block include the download byte enables from the master download data bus. The masked byte enables are generated in response to a mask signal generated by cycle control logic 343. The cycle control logic 343 also generates a data path clock 344 which is supplied to all of the stages in the data path aligner.

The stages in the data path aligner include seven four to one selector/registers. The first selector/register 350 has input 3 connected to byte lane 340(1), input 2 connected to byte lane 340(2), and input 1 connected to byte lane 340(3). Input 0 is unconnected and has an invalid byte enable bit. The selector/register 351 receives byte lane 340(2) at input 3 and byte lane 340(3) at input 2. Inputs 1 and 0 have no data connected with invalid byte enable bits set. Selector/register 352 receives byte lane 340(3) at input 3. Inputs 2, 1 and 0 have no data and invalid byte enable bits set.

Each of the selector/registers 350–352 include reset inputs R. The reset input is generated at the output of OR gate 341. The inputs to the OR gate include a new descriptor signal and a download DMA reset signal. Thus, each of the selector/registers 35014 352 is reset when a new transmit buffer descriptor is encountered in the download process, or when the download DMA is reset.

Each of the registers 350–352 receives at the select inputs S(1:0) the dataPathOffset signal (1:0) generated in the logic of FIG. 10.

The second stage of the data path aligner includes selector/registers 353, 354, 355 and 356. They generate output data for lanes 360(0), 360(1), 360(2) and 360(3). These output data lanes provide a byte enable signal and a byte of buffer download data to the RAM interface logic in the adaptor.

The selector/registers 353–356 all receive the same data path offset (1:0) at the respective selector inputs S(1:0).

The inputs to selector/register 353 include the output of selector/register 350 at inputs 3, 2 and 1, and the data from input lane 340(0) at input 0. The inputs to selector/register 354 include the output of selector/register 351 at inputs 3 and 2, the data from byte lane 340(0) at input 1, and the data from byte lane 340(1) at input 0. The inputs to selector/register 355 include the output of selector/register 352 at input 3, the data in lane 340(0) at input 2, the data from lane 340(1) at input 1, and the data from byte lane 340(2) at input 0. Finally, the inputs to selector/register 353 include the data from lane 340(0) at input 3, the data from lane 340(1) at input 2, the data from lane 340(2) at input 1, and the data from lane 340(3) at input 0.

At the end of a data path transfer, the cycle control logic 343 monitors the byte enable bits from the registers 350, 351 and 352 in the first stage of the data path aligner. If valid data is detected, then an extra data path clock signal on line 344 is asserted as well as the mask byte enable signal on line 345. The mask byte enable signal ensures that all of the byte enable signals on the input lanes 340(0) through 340(3) are asserted invalid. The extra data path clock signal on line 344 causes any data in the first stage registers 350 through 352 to be passed to the second stage registers 353 through 356. If any valid data appears, then the valid data will then be available for a next write cycle to the destination memory.

Every time a single data buffer has completed its transfer from the host, the transition to the next data buffer in the adaptor is considered a new DMA transfer and the new descriptor signal is asserted. This causes the data path registers to flush.

The new starting address of the host is determined by extracting the appropriate value from the transmit descriptor in the adaptor's RAM. The new starting address for the adaptor is the next byte pointed to by the download DMA controller at the end of the previous transfer.

For example, if 202 bytes were transferred starting at (and including) adaptor RAM address 3c4, then the last byte from this transfer ended up at location 505. This means that the very next byte from the DMA controller should be deposited in adaptor memory location 5c6.

Two things must be determined prior to commencing the next phase of a transfer: (i) whether or not to increment the (double word boundary) adaptor address; and (ii) what the correct value of the least significant two bits of that address should be.

The adaptor address (bits 11 through 2) should be incremented only if byte 3 of the last word of the previous transfer phase were written to (contained valid data). If this is the case, then the next byte in a continuous stream of bytes would belong at byte 0 of the next double-word Under all other circumstances, the adaptor address value must not increment from one phase to the next.

The least significant two bits of the adapter address are determined by adding the least significant two bits of the starting address to the least significant two bits of the byte count and disregarding the carry.

Unless the previous transfer phase ended on a double-word boundary, two write cycles to the same adaptor memory location will occur between phases of a transfer.

C. Receive Process

The receive process also involves a data path alignment function according to the present invention. Background concerning the operation of the receive process is provided with respect to FIGS. 12–14. FIG. 15 provides the structure of the receive data path alignment logic.

The receive buffer is a 22K byte ring of variable length receive frames. Each frame is preceded by a header that defines the frame's size and status and the location of the header of the next frame in the ring buffer.

The beginning of a receive frame entry in the ring can begin on any 32 bit word boundary. The receive data is buffered in the format illustrated in FIG. 12.

The 32 bit NEXT RCV PTR value contains the address of the NEXT RCV PTR value of the next entry in the ring. This value becomes valid upon completion of the reception of the present associated frame. The buffer pointed to by NEXT RCV PTR may not necessarily contain a valid frame. This must be determined by the ring maintenance pointers that determine the beginning and end of the valid entries within the ring.

The RCV FRAME STATUS word contains the various error codes regarding the condition of the associate frame. RCV FRAME STATUS is updated immediately after frame reception. The contents of this entry are made available to the host via the RCV FRAME STATUS register.

The upper 16 bit word of the RCV FRAME SIZE entry is occupied by the adaptor's MACID value. This value is retrieved from the MACID register and deposited in this word of the receive buffer data structure at the same time that the RCV FRAME SIZE value is posted.

The length of the received frame is deposited in the RCV FRAME SIZE register immediately after the frame has been received. The contents of this entry are made available to the host via the RCV FRAME SIZE register.

The RECEIVE DATA field varies in length from 1 to 1,514 bytes. The receive frame—starting with the destination address—is stored in this field as the frame is being received, The adaptor in one preferred implementation accommodates one and only one transfer descriptor at a time. Attempts to download a second descriptor while the first one is being processed will result in a return code from the XFER QUEUE STATUS register that indicates a lack of resources to accept the request. Only the frame currently visible via the LOOKBUF is acted upon by the transfer specification within the XFER AREA register.

The transfer descriptor is stored in adaptor RAM using the format of FIG. 13.

The TD OFFSET word defines the offset into the received frame from which the transfer will commence. This value need not be a multiple of four. Data that the host has already examined (via the LOOKBUF) may not need to be transferred to the host. Therefore, a non-zero value written into the TD OFFSET field will cause the bus master circuit to offset its start address by TD OFFSET bytes before beginning the transfer. This value may range from zero (transfer from the beginning of the frame) to 1,514.

The number of length/pointer pairs is defined in the TD BUFFER COUNT field. As many a 127 entries are allowed. Beyond that, XFER AREA buffer exhaustion is assured. This value must be non-zero.

The TD DATA LEN field contains the size of the host's receive buffer into which receive data will be transferred. The adaptor is not restricted to transferring only 32 bit words. Attempting to transfer more than the maximum frame length of 1,514 bytes will cause the adaptor to terminate the transfer upon reaching the end of the frame.

The 32 bit TD DATA PTR value is the physical address of the first byte of the host's receive buffer. This value need not be a multiple of four.

The physical address of the data buffer in the host to which a received frame will be uploaded is written to the adaptor as a 32 bit TD DATA PTR value in XFER AREA. The adaptor will use this value as a pointer to the first byte in the receive buffer. There are no restrictions placed on the value of this pointer by the adaptor. Byte, word and double word alignment of the buffer data are all supported.

FIG. 14 is a heuristic diagram of the host interface logic and the network interface logic which is involved in the receive function. The host interface logic includes the upload DMA logic 400 and the view logic 401. The upload DMA logic 400 interfaces with the host through the XFER address block described below. The view logic 401 interfaces with the host through LOOKBUF and related address blocks described below.

The network interface logic includes the receive DMA logic 402. Both the host interface logic and network interface logic interface with the receive ring buffer area 403 in the host independent adaptor memory. Also, the upload DMA logic 400 interfaces with the transfer descriptor area 404 within the host independent adaptor memory.

This logic is also responsible for maintaining the receive buffer ring. Thus, a plurality of pointers are involved. The upload DMA logic generates a receive tail pointer RT which points to the base address of a frame being uploaded, which is also the tail end of the ring. The view logic generates a current frame pointer CF which points to the base address of LOOKBUF in the adaptor memory, or a frame being viewed by the view logic 401.

The receive DMA logic 402 generates a current receive pointer CR, pointing to the base address of a frame being received, a receive write pointer RW pointing to a location where data in the current frame is being written. The receive DMA logic 402 also generates a next receive pointer NR which points to the starting position of a next receive frame during status posting.

A further understanding of the receive process can be gained from an understanding of the host address map involved as described in the above referenced copending U.S. patent application entitled "Network Interface with Host Independent Buffer Management".

D. Receive Data Path Logic

Figure 15:
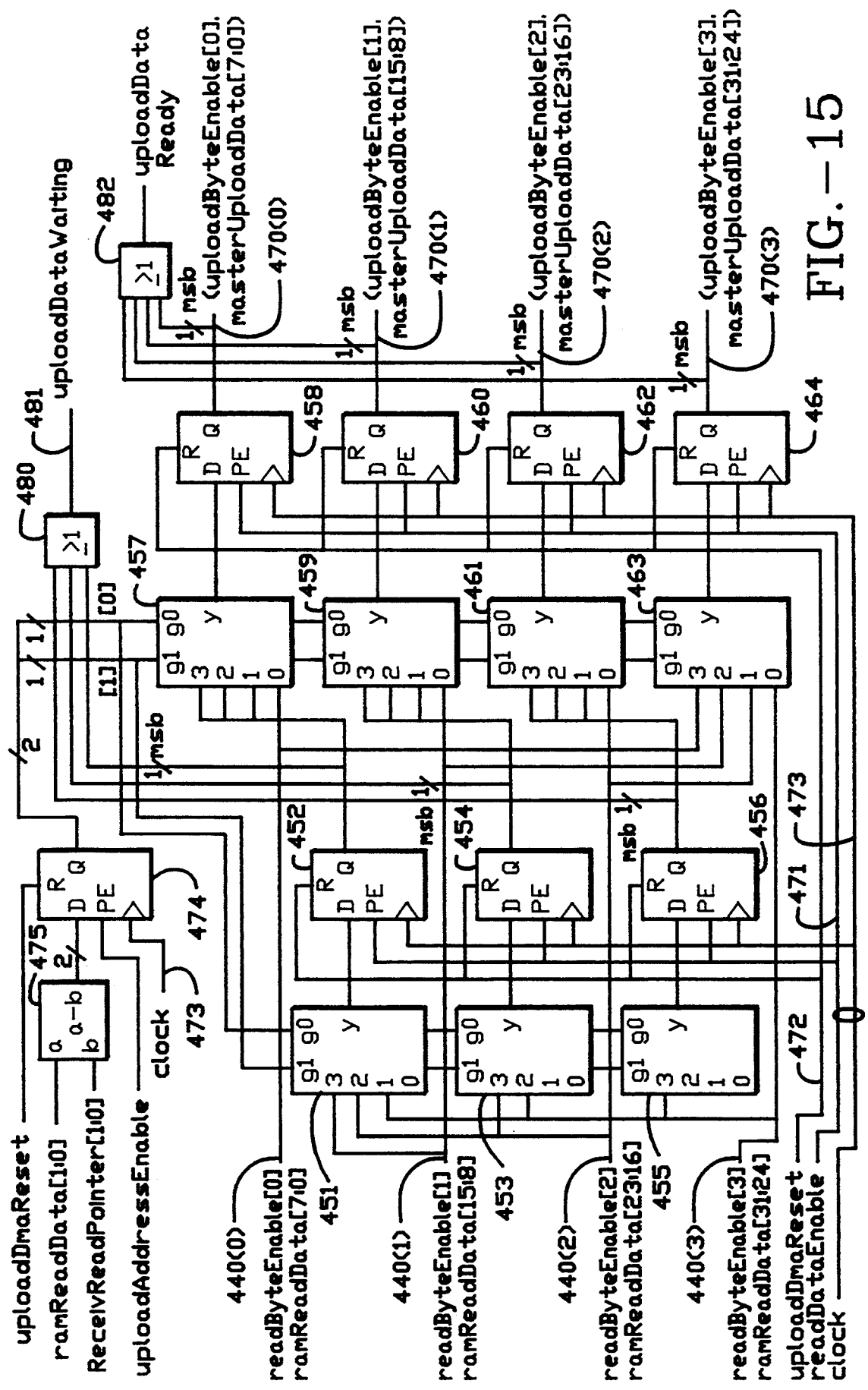
FIG. 15 is a schematic diagram of the data path aligner in the receive path for the network interface controller of FIG. 4.

FIG. 15 illustrates the implementation of the receive data path in the upload DMA module. The inputs include byte lanes 440(0), 440(1), 440(2) and 440(3). Each of the input lanes receives a read byte enable signal and eight bits of the RAM read data bus. The outputs include byte lanes 470(0), 470(1), 470(2) and 470(3). Each of the output lanes supplies eight bits of master upload data and an upload byte enable bit to the host bus interface. Like the embodiment of FIG. 1 and of FIG. 11, the system includes three first stage selector/registers and four second stage selector/registers. The three first stage selector/registers in this embodiment are composed of selector 451 and register 452, selector 453 and register 454, and selector 455 and register 456. The selector 451 includes inputs 3, 2, 1 and 0 which are connected to byte lanes 440(1), 440(2), 440(3) and unconnected with an invalid byte enable bit, respectively. The output of selector 451 is connected to the D input of register 452. The inputs 3 and 2 of selector 453 are connected to byte lane 440(2), byte lane 440(3), respectively, and inputs 1 and 0 are unconnected with invalid byte enable bits. The output of selector 453 is connected to the D input of register 454. Selector 455 has input 3 connected to byte lane 440(3). Inputs 2, 1 and 0 are unconnected with invalid byte enable bits set. The output of selector 455 is connected to the D input of register 456.

The four second stage selector/registers of the byte aligner include selector 457 and register 458, selector 459 and register 460, selector 461 and register 462, and selector 463 and register 464. The inputs 3, 2 and 1 of selector 457 are connected to the output of register 452. Input 0 is connected to byte lane 440(0). Inputs 3 and 2 of selector 459 are connected to the output of register 454. Input 1 is connected to byte lane 440(0) and input 0 is connected to byte lane 440(1). Input 3 of selector 461 is connected to the output of register 456. Input 2 is connected to byte lane 440(0), input 1 is connected to byte lane 440(1), and input 0 is connected to byte lane 440(2). Selector 463 has input 3 connected to byte lane 440(0), input 2 connected to byte lane 440(1), input 1 connected to byte lane 440(2) and input 0 connected to byte lane 440(3).

The outputs of selectors 457, 459, 461 and 463 are connected to the inputs of registers 458, 460, 462 and 464, respectively. The outputs of registers 458, 460, 462 and 464 are connected to drive the output lanes 470(0), 470(1), 470(2) and 470(3).

In the embodiment of FIG. 15, registers 452, 454, 456, 458, 460, 462 and 464 include enable inputs PE which are driven by the read data enable signal on line 471 generated by the data path control logic. The reset inputs R on the registers are driven by an upload DMA reset signal on line 472, and the clock inputs are connected to a common data path clock on line 473.

The data path offset signal is generated at the output of register 474. The input to register 474 is two bits from the output of subtraction logic 475. The inputs to subtraction logic include the RAM read data (1:0) which includes the lower two bits of the adaptor RAM address subject of the upload, and the receive read pointer (1:0) which provides the lower two bits of the host buffer address. The receive/read pointer is generated based on the destination address at the beginning of the frame plus the number of bytes read during the transfer.

The register 474 is enabled by the upload address enable signal generated at the beginning of an upload process, and is clocked by clock 473 which also drives the registers in the data path.

The embodiment of FIG. 15 illustrates the logic for generating an upload data waiting signal which is used in the case that an extra clock cycle is necessary to purge the data in the stages 452, 454 and 456 at the end of a transfer. Thus, the logic includes OR gate 480 which receives at its input the byte enable signals from the outputs of registers 452, 454 and 456. If any one of the byte enable signals indicates valid data, the upload data waiting signal on line 481 is asserted. The signal is supplied to cycle control logic which causes an extra clock cycle to be generated.

Similarly, FIG. 15 illustrates the upload data ready logic. The upload data ready logic includes OR gate 482. The inputs to OR gate 482 include the byte enable bits from output lanes 470(0) through 470(3). If any one of the output lanes includes valid data, then an upload data ready signal is asserted to the bus interface logic, signaling the need for a bus master operation to write the data to the host system.

IV. Conclusion

In conclusion, the present invention provides a data path aligner for use with DMA transfers that may or may not align on byte boundaries. The mechanism provides for accomplishing the data path alignment without extra accesses to the source memory, and with simplified control logic over prior art systems. The data path aligner is applicable to a wide variety of DMA environments requiring high speed efficient transfer of data that may or may not be aligned on byte boundaries.

The present invention further provides for a network adaptor using a path aligner in both the transmit and receive paths. This reduces the processing load on the host system which uses the adaptor, and increases the throughput of the system in general.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. An apparatus for transferring data from an input data path having N segment lanes L(i), for i equal to 0 through N−1, each segment lane for transferring a segment of data and a segment enable bit, to an output data path having N segment lanes O(i), for i equal to 0 through N−1, each segment lane for transferring a segment of data, comprising:

a control input for a data path offset signal indicating a mapping of data on the input data path to the output data path;

a first stage including N−1 first elements S1(i), for i equal to 0 to N−2, the N−1 first elements S1(i) having respective inputs connected to respective input subsets of a set including a plurality of the N segment lanes, the input subset for first elements S1(i) including segment lanes L(j) for j going from i+1 to N−1, and having respective outputs, each of the N−1 first elements S1(i) supplying a segment of data and a segment enable bit to its output from a segment lane in its respective input subset in response to the data path offset signal; and a second stage including N second elements S2(i) for i equal to 0 to N−1, the N second elements having respective inputs connected to respective input subsets of a set including the N segment lanes and the outputs of first elements, the input subset for second element S2(i) including segment lanes L(k) for k going from i to zero and, for i less than or equal to N−2, the output of first element S1(i), and having respective outputs, each of the N second elements S2(i) supplying a segment of data from its respective input subset to its respective output segment lane O(i) in response to the data path offset signal.

2. The apparatus of claim 1 further including logic which generates the data path offset signal for supply to the control input in response to a difference between at least one low order bit of a destination address of data on the output data path and at least one low order bit of a source address for data on the input data path.

3. The apparatus of claim 1, wherein the plurality of second elements further supply output segment enable bits to the output segment lanes.

4. The apparatus of claim 1, wherein the first and second stages are further responsive to a clock signal, and further including:
   means for supplying the clock signal to the first and second elements.

5. The apparatus of claim 4, wherein the means for supplying the clock signal includes means for asserting an additional clock signal after a block transfer to flush data from the first stage to the second stage.

6. The apparatus of claim 5, further including:
   means for masking the input segment enable bits during the additional clock signal.

7. The apparatus of claim 1, wherein the N second elements each include N inputs and for second element S2(i), for i less than or equal to N−2, the input subset includes N−1-i copies of the output of first element S1(i).

8. The apparatus of claim 7, wherein the N second elements each comprise:
   a selector having N inputs connected to respective members of the input subset and an output selected in response to the data path offset signal, and
   a storage element, having an input connected to the output of the selector and an output connected to a respective output segment lane, for storing a segment of data and a segment enable signal for supply to the respective output segment lane.

9. The apparatus of claim 1, wherein the N−1 first elements each include N inputs and for first element S1(i), the input subset includes i+1 inputs with fixed invalid segment enable signals.

10. The apparatus of claim 9, wherein the N−1 first elements each comprise:
    a selector having N inputs connected to respective members of the input subset and having an output for supplying a segment of data and a segment enable signal selected in response to the data path offset signal, and a storage element, having an input connected to the output of the selector and having an output, for storing a segment of data and a segment enable signal and providing the output data segment and segment enable bit at the output.

11. The apparatus of claim 1, wherein each segment consists of a byte of data, and N equals 4.

12. An apparatus for transferring blocks of data from multi-segment locations having respective source addresses in source memory to multi-segment locations having respective destination addresses in destination memory, comprising:

an input data path, for connection to the source memory, having N segment lanes L(i), for i equal to 0 through N−1, each segment lane transferring a segment of data and supplying a segment enable bit;

transfer logic which generates source and destination addresses for transferring data;

an output data path for connection to the destination memory, having N segment lanes O(i) for transferring a segment of data and supplying a segment enable bit; and alignment logic, connected between the input and output data path and to the transfer logic, which controls alignment of segments of data in the output data path in response to the source and destination addresses so that multi-segment locations in the destination memory are filled with data of a transfer without requiring multiple reads per source address to multi-segment locations in the source memory when the segments in the source memory are not aligned with multi-segment boundaries of the destination memory.

13. The apparatus of claim 12, wherein the alignment logic comprises:

means, responsive to the source and destination addresses, for supplying a data path offset signal indicating a difference in alignment of segments of data in locations in the source memory and destination memory;

a first stage including N−1 first elements S1(i), for i equal to 0 to N−2, the N−1 first elements S1(i) having respective inputs connected to respective input subsets of a set including a plurality of the N segment lanes, the input subset for first element S1(i) including segment lanes L(j) for j going from i+1 to N−1, and having respective outputs, each of the N−1 first elements S1(i) supplying segment of data and a segment enable bit to its output from a segment lane in its respective input subset in response to the data path offset signal;

a second stage including N second elements S2(i) for i equal to 0 to N−1, the N second elements having outputs connected to respective output segment lanes of the output data path and having respective inputs connected to respective input subsets of a set including the N segment lanes and the outputs of first elements, the input subset for second element S2(i) including segment lanes L(k) for k going from i to zero and, for i less than or equal to N−2, the output of first element S1(i), and having respective outputs, each of the N second elements S2(i) supplying a segment of data and segment enable bit from the respective input subset to its respective output segment lane in response to the data path offset signal.

14. The apparatus of claim 13, wherein the first and second elements are further responsive to a clock signal, and further including:

means for supplying the clock signal to the first and second elements.

15. The apparatus of claim 14, wherein the means for supplying the clock signal includes means for asserting an additional clock signal after a block transfer to flush data from the first stage to the second stage.

16. The apparatus of claim 15, further including:

means for masking the input segment enable bits during the additional clock signal.

17. The apparatus of claim 13, wherein the N second elements each include N inputs and for second element S2(i), for i less than or equal to N−2, the input subset includes N−1-i copies of the output of first element S1(i).

18. The apparatus of claim 17, wherein the N second elements each comprise:

an selector having N inputs connected to respective members of the input subset and an output selected in response to the data path offset signal, and a storage element, having an input connected to the output of the selector and an output connected to a respective output segment lane, for storing a segment of data and a segment enable signal for supply to the respective output segment lane.

19. The apparatus of claim 13, wherein the N first elements each include N inputs and for first element S1(i), the input subset includes i+1 inputs with fixed invalid segment enable signals.

20. The apparatus of claim 19, wherein the N first elements each comprise:

a selector having N inputs connected to respective members of the input subset and having an output for supplying a segment of data and a segment enable signal selected in response to the data path offset signal, and a storage element, having an input connected to the output of the selector and having an output, for storing a segment of data and a segment enable signal and providing the output data segment and segment enable bit at the output.

21. The apparatus of claim 12, wherein the destination memory comprises a buffer, a network adaptor, and the data subject of transfer to the destination memory includes data of frame of data for transmission on a network through the network adaptor.

22. The apparatus of claim 12, wherein each segment consists of a byte of data, and N equals 4.

23. The apparatus of claim 12, wherein the transfer logic comprises DMA logic.

24. An apparatus for controlling communication between a host system and a network transceiver coupled with a network, comprising:

a transmit buffer for buffering data of frames transferred from the host system in multi-segment locations;

a data path between the transmit buffer and the host system;

download logic coupled to the data path, which downloads data of frames from the host system to the transmit buffer, including logic to supply source addresses of memory in the host system for data of a frame and destination addresses for the transmit buffer;

network interface circuitry, having an interface to the network transceiver, to transfer data between the transmit buffer and the network transceiver for transmission; and download alignment logic, in the data path, which controls alignment of segments of data in the data path in response to the source and destination addresses so that multi-segment locations in the transmit buffer may be filled with data of a frame without requiring multiple reads per source address to multi-segment locations in memory in the host system when the segments in the host memory are not aligned with multi-segment boundaries of the transmit buffer.

25. The apparatus of claim 24, where the download alignment logic includes:

an input data path, for connection to the host system, having N segment lanes L(i), for i equal to 0 through N−1, each segment lane transferring a segment of data from the host system and supplying a segment enable bit;

means, responsive to the source and destination addresses, for supplying a data path offset signal indicating a difference in alignment of segments of data in locations in the host system and the transmit buffer;

a first stage including N−1 first elements S1(i), for i equal to 0 to N−2, the N−1 first elements S1(i) having respective inputs connected to respective input subsets of a set including a plurality of the N segment lanes, the input subset for first element S1(i) including segment lanes L(j), for j going from i+1 to N−1, and having respective outputs, each of the N−1 first elements S1(i) supplying a segment of data and a segment enable bit to its output from a segment lane in its respective input subset in response to the data path offset signal;

a second stage including N second elements S2(i) for i equal to 0 to N−1, the N second elements having respective inputs connected to respective input subsets of a set including the plurality of segment lanes and the outputs of first elements, the input subset for second element S2(i) including segment lanes L(k) for k going from i to zero and, for i less than or equal to N−2, the output of first element S1(i), and having respective outputs, each of the N second elements supplying a segment of data and segment enable bit from its respective input subset to its respective output in response to the data path offset signal; and an output data path connected to the transmit buffer having N segment lanes O(i) connected to the outputs of respective second stages S2(i), for i equal to 0 through N−1, each segment lane for transferring a segment of data to a location in the transmit buffer and supplying a segment enable bit.

26. The apparatus of claim 25, wherein the first and second stages are further responsive to a clock signal, and further including:

means for supplying the clock signal to the first and second elements.

27. The apparatus of claim 26, wherein the means for supplying the clock signal includes means for asserting an additional clock signal after a block transfer to flush data from the first stages to the second stages.

28. The apparatus of claim 27, further including:

means for masking the input segment enable bits during the additional clock signal.

29. The apparatus of claim 25, wherein the N second elements each include N inputs and for second element S2(i), for i less than or equal to N−2, the input subset includes N−1−i copies of the output of first element S1(i).

30. The apparatus of claim 29, wherein the N second elements each comprise:

an selector having N inputs connected to respective members of the input subset and an output selected in response to the data path offset signal, and a storage element, having an input connected to the output of the selector and an output connected to a respective output segment lane for storing a segment of data and a segment enable signal for supply to the respective output segment lane.

31. The apparatus of claim 25, wherein the N−1 first elements each include N inputs and for first element S1(i), the input subset includes i+1 inputs with fixed invalid segment enable signals.

32. The apparatus of claim 31, wherein the N−1 first elements each comprise:

a selector having N inputs connected to respective members of the input subset and having an output for supplying a segment of data and a segment enable signal selected in response to the data path offset signal, and a storage element, having an input connected to the output of the selector and having an output, for storing a segment of data and a segment enable signal and providing the output data segment and segment enable bit of the first stage at the output.

33. The apparatus of claim 24, further including:

a receive buffer for buffering data of frames received from the network in multi-segment locations;

an upload data path between the receive buffer and the host system;

upload logic, coupled to the data path, which uploads data of frames from the receive buffer to the host system, including logic for generating upload addresses of memory in the host system for data of a frame and buffer addresses for the receive buffer;

upload alignment logic in the upload data path, to control alignment of segments of data in the data path in response to the upload and buffer addresses so that multi-segment locations in the host memory are filled with data of a frame without requiring multiple reads per buffer address to multi-segment locations in the receive buffer when the segments in the receive buffer are not aligned on multi-segment boundaries of locations in the host memory.

34. The apparatus of claim 24, wherein each segment consists of a byte of data, and N equals 4.

35. The apparatus of claim 24, wherein the means for generating source and destination addresses comprises DMA logic.

* * * * *